US012735303B1

(12) United States Patent
Batman

(10) Patent No.: US 12,735,303 B1
(45) Date of Patent: Sep. 15, 2026

(54) FLOATING INSPECTION SENSOR ELEVATOR SYSTEM

(71) Applicant: The United States of America, as represented by the Secretary of the Navy, Arlington, VA (US)

(72) Inventor: John Russel Batman, Stafford, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 232 days.

(21) Appl. No.: 18/797,220

(22) Filed: Aug. 7, 2024

Related U.S. Application Data

(60) Provisional application No. 63/559,310, filed on Feb. 29, 2024, provisional application No. 63/578,045, filed on Aug. 22, 2023.

(51) Int. Cl.
*B66C 23/52* (2006.01)
*B63B 27/16* (2006.01)
*E02B 17/00* (2006.01)

(52) U.S. Cl.
CPC .......... *B66C 23/52* (2013.01); *E02B 17/0034* (2013.01); *B63B 2027/165* (2013.01)

(58) Field of Classification Search
CPC ......................... B63B 2027/165; B66C 23/52; E02B 17/0034
See application file for complete search history.

(56) References Cited

U.S. PATENT DOCUMENTS 1,134,881 A * 4/1915 Lockwood .......... E02B 17/0021 15/160
3,536,023 A * 10/1970 Bascom .................. B63B 27/36 114/259

(Continued)

FOREIGN PATENT DOCUMENTS

AU 2021107149 A4 * 12/2021 ......... E02B 17/0034

OTHER PUBLICATIONS

Oceaneering International Ltd., Splash Zone Riser Inspection Tool | Oceaneering, video, Houston, TX, United States https://www.youtube.com/watch?v=j0EzRcr0uLA.

(Continued)

*Primary Examiner* — Matthew Wiblin
(74) *Attorney, Agent, or Firm* — Naval Facilities Engineering and Expeditionary Warfare Center; Jimmy M. Sauz

(57) ABSTRACT

A floating inspection sensor elevator system. The floating inspection sensor elevator system may comprise: a reeling apparatus mounted on a floating vessel, a submersible inspection sensor sled operably coupled to the reeling apparatus via umbilical cables and reels, and a computer system in signal communication with one or more sensors located on the submersible inspection sensor sled. The reeling apparatus may comprise a base frame, reels, reeling arms, pulleys swivelly coupled to the reeling arms, and the umbilical cables. The submersible inspection sensor sled may have a substantially u-shaped configuration for engaging a pile. The sensors may be configured to capture one or more aspects of the pile to generate sensor data and may include a camera, sonar transducer, or laser scanner. The umbilical cables may be used to transfer the sensor data from the submersible inspection sensor sled to the computer system to process the sensor data.

20 Claims, 15 Drawing Sheets

(56) References Cited

U.S. PATENT DOCUMENTS

| | | | | | |
|---|---|---|---|---|---|
| 6,371,696 | B1 * | 4/2002 | Eathorne | E02B 17/0034 | 405/211.1 |
| 8,070,391 | B2 | 12/2011 | White | | |
| 8,365,228 | B2 * | 1/2013 | Nishina | H04N 21/26283 | 725/71 |
| 8,465,228 | B2 | 6/2013 | Doleshal | | |
| 9,339,670 | B1 * | 5/2016 | Burnham | B05B 13/005 | |
| 2005/0160959 | A1 * | 7/2005 | Roodenburg | B63B 27/36 | 114/258 |
| 2010/0235018 | A1 * | 9/2010 | Christ | G01N 21/952 | 348/81 |
| 2012/0160143 | A1 * | 6/2012 | Bailey | B63B 21/66 | 114/61.1 |
| 2013/0136564 | A1 * | 5/2013 | Teppig, Jr. | B63B 27/36 | 414/803 |
| 2014/0158171 | A1 * | 6/2014 | Doleshal | B08B 3/024 | 134/172 |
| 2016/0144937 | A1 * | 5/2016 | Van Rompay | B08B 1/36 | 134/6 |
| 2018/0136144 | A1 * | 5/2018 | Blunk | G01N 21/01 | |
| 2018/0347549 | A1 * | 12/2018 | Huot | B66C 23/185 | |
| 2025/0012031 | A1 * | 1/2025 | De Roo | E02D 7/18 | |
| 2025/0042515 | A1 * | 2/2025 | Cole | B63B 27/16 | |
| 2025/0178704 | A1 * | 6/2025 | Hartog | B63B 59/06 | |

OTHER PUBLICATIONS

Can-As, Riser Inspection Tool—Cleaning and visual inspection, video, Houston, TX, United States https://www.youtube.com/watch?v=BaEif5VFxUQ.

Melquisedec Santos, Production Riser Inspection Robot SIRIS, United States https://www.youtube.com/watch?v=fjhk20J_8Rc.

Innospection Ltd., Innospection—Subsea Inspection with MEC technology, Mooring Line Inspection/Wirescan Inspection Tool, United States https://www.youtube.com/watch?v=9n0PpjAHCOM.

Jetcut, Automated Sub Sea Pipe Cleaning Tool, United States https://www.youtube.com/watch?v=2r7LkKs7d9M.

* cited by examiner

FLOATING INSPECTION SENSOR ELEVATOR SYSTEM

CROSS-REFERENCE TO RELATED APPLICATIONS

This Application claims the benefit of U.S. provisional patent application No. 63/578,045, filed on Aug. 22, 2023, titled "Pile Inspection Camera Elevator System," by co-inventors John Russel Batman, John Andrew Allen, Michael Wyatt Boettger, John Damaso Dancel, and Carl David Brown, the contents of which are incorporated herein by this reference and to which priority is claimed. This Application also claims the benefit of U.S. provisional patent application No. 63/559,310, filed on Feb. 29, 2024, titled "Floating Inspection Sensor Elevator (FISE) System," by co-inventors John Russel Batman, John Andrew Allen, John Damaso Dancel, Carl David Brown, and Gary Roy Baumbeck Jr., the contents of which are incorporated herein by this reference and to which priority is claimed.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF USE

The present disclosure relates generally to inspection systems, and more particularly, to systems and apparatuses for inspecting piles of a pier, bridge, or similar structures.

BACKGROUND

In general, piles or structural pilings are columns inserted beneath the strata to transmit a structural load to the lower level of the subsoil strata and are generally constructed of various materials such as timber, concrete, or steel. Steel or concrete pile-supported structures are generally inspected every six years via visual inspection by human divers.

Conventional methods of inspecting piles and piers require a human diver to typically dive into deep waters, which may present significant challenges and expenses. For example, diving deeper depths are inherently less safe compared to diving at shallower depth(s), given that diving below 100 feet of sea water (fsw) generally increases the hazards of diver decompression sickness. Additionally, diving below 100 fsw requires a diver recompression chamber, which is typically unavailable at remote locations. As a result, an inspection team may encounter safety issues or incur significant expenses to mobilize a recompression chamber.

Furthermore, during a typical underwater pile inspection, utilizing a remotely operated vehicle (ROV) can be relatively slow, and the development of sensors for use during diving or ROV operation also currently require testing by actual divers or ROVs. However, scheduling a dive may be inconvenient for the four to six-person team, or the complex ROV may malfunction resulting in incurring expenses. In this regard, there is a need for a pile inspection mechanism that is safer and more cost-effective.

SUMMARY OF ILLUSTRATIVE EMBODIMENTS

To minimize the limitations in the related art and other limitations that will become apparent upon reading and understanding the present specification, the following discloses embodiments of a new and useful floating inspection sensor elevator system.

One embodiment may be a floating inspection sensor elevator system, comprising: a submersible inspection sensor sled having a u-shaped configuration and comprising: a base sled frame configured to engage a pile and comprising: upper and lower u-shaped frames coupled to each other and disposed in parallel relation, each of the upper and lower u-shaped frames comprising a pair of arms and a horizontal bar joining proximal ends of the pair of arms; a plurality of guide wheels configured to slide the submersible inspection sensor sled along the pile; and one or more sensors oriented to focus substantially inwards towards a center area within the upper and lower u-shaped frames, the one or more sensors being configured to inspect one or more aspects of the pile and generate sensor data; a reeling apparatus, comprising: a base frame configured to mount onto a floating vessel; a pair of reeling arms mounted to the base frame and disposed in parallel relation to each other; a pair of reels coupled to the base frame; a pair of pulleys, each swivelly coupled near distal ends of each of the pair of reeling arms; and a pair of umbilical cables having distal umbilical cable ends coupled to the submersible inspection sensor sled, proximal umbilical cable ends windable to the pair of reels, and intermediate umbilical cable portions reeved around sheaves of the pair of pulleys; and a computer system comprising one or more processors configured to process the sensor data generated by the one or more sensors and control the pair of reels; wherein the pair of umbilical cables may be in signal communication between the one or more sensors and the computer system, the pair of umbilical cables being configured to transfer the sensor data from the submersible inspection sensor sled to the computer system. The floating vessel may be a boat. The floating vessel may be a pair of hulls, each having a rail coupled to the hull; wherein the base frame may be mounted near proximal ends of the pair of rails, such that the pair of hulls, the pair of rails, and the base frame may have a substantially u-shaped configuration; wherein the floating inspection sensor elevator system may further comprise a thruster system coupled to the pair of hulls; and wherein the computer system may be configured to control the thruster system. At least one of the pair of reeling arms may be a davit arm. The pair of reeling arms may be a pair of support rails disposed in parallel relation to each other and fixedly coupled to the pair of rails coupled to the pair of hulls. The one or more sensors may be selected from the group of sensors, consisting of: a camera, a sonar, and a laser scanner. The pair of reeling arms may be pivotally mounted to the base frame and may be telescoping in length. The base frame may further comprise a pair of sliding rails configured to mount onto the floating vessel, such that the base frame may be configured to slide horizontally along the floating vessel.

Another embodiment may be a floating inspection sensor elevator system, comprising: a submersible inspection sensor sled having a u-shaped configuration and comprising: a base sled frame configured to engage a pile and comprising: upper and lower u-shaped frames coupled to each other and disposed in parallel relation; a plurality of guide wheels configured to slide the submersible inspection sensor sled along the pile; and one or more sensors oriented to focus substantially inwards towards a center area within the upper and lower u-shaped frames, the one or more sensors being configured to inspect one or more aspects of the pile and generate sensor data; a reeling apparatus, comprising: a base frame configured to mount onto a boat; first and second reeling arms mounted to the base frame and disposed in parallel relation to each other; first and second reels coupled to the base frame; first and second pulleys swivelly coupled near distal ends of the first and second reeling arms, respectively; a first umbilical cable having a first distal umbilical cable end coupled to the submersible inspection sensor sled, a first proximal umbilical cable end windable to the first reel, and a first intermediate umbilical cable portion reeved around a first sheave of the first pulley; and a second umbilical cable having a second distal umbilical cable end coupled to the submersible inspection sensor sled, a second proximal umbilical cable end windable to the second reel, and a second intermediate umbilical cable portion reeved around a second sheave of the second pulley; and a computer system comprising one or more processors configured to process the sensor data generated by the one or more sensors and control the pair of reels; wherein the first and second umbilical cables may be in signal communication between the one or more sensors and the computer system, the first and second umbilical cables being configured to transfer the sensor data from the submersible inspection sensor sled to the computer system. The upper u-shaped frame may comprise: first and second arms disposed in parallel relation to each other and a first horizontal bar having opposing ends orthogonally joining proximal ends of the first and second arms; wherein the lower u-shaped frame may comprise: third and fourth arms disposed in parallel relation to each other and a second horizontal bar having opposing ends orthogonally joining proximal ends of the third and fourth arms; and wherein the submersible inspection sensor sled may further comprise: a plurality of vertical bars coupled to the upper and lower u-shaped frames; and a plurality of guide bars coupled to the upper and lower u-shaped frames and disposed in a substantially vertical manner, wherein the plurality of guide wheels may be rotatably coupled to opposing ends of the plurality of guide bars. The first and second reeling arms may be davit arms. The pair of reeling arms may be pivotally mounted to the base frame and may be telescoping in length. The base frame may further comprise first and second sliding rails configured to mount onto the boat, such that the base frame may be configured to slide horizontally along the boat. The one or more sensors may be selected from the group of sensors, consisting of: a camera, a sonar, and a laser scanner.

Another embodiment may be a floating inspection sensor elevator system, comprising: a submersible inspection sensor sled having a u-shaped configuration and comprising: a base sled frame configured to engage a pile and comprising: upper and lower u-shaped frames coupled to each other and disposed in parallel relation; a plurality of guide wheels configured to slide the submersible inspection sensor sled along the pile; and one or more sensors oriented to focus substantially inwards towards a center area within the upper and lower u-shaped frames, the one or more sensors being configured to inspect one or more aspects of the pile and generate sensor data; a reeling apparatus, comprising: abase frame configured to mount on to first and second hulls, comprising first and second rails, respectively, the first rail being coupled to the first hull and the second rail being coupled to the second hull; wherein the base frame is mounted near proximal ends of the first and second rails, such that the first and second hulls, the first and second rails, and the base frame have a substantially u-shaped configuration; first and second reeling arms mounted to the base frame and disposed in parallel relation to each other; first and second reels coupled to the base frame; first and second pulleys swivelly coupled near distal ends of the first and second reeling arms, respectively; a first umbilical cable having a first distal umbilical cable end coupled to the submersible inspection sensor sled, a first proximal umbilical cable end windable to the first reel, and a first intermediate umbilical cable portion reeved around a first sheave of the first pulley; and a second umbilical cable having a second distal umbilical cable end coupled to the submersible inspection sensor sled, a second proximal umbilical cable end windable to the second reel, and a second intermediate umbilical cable portion reeved around a second sheave of the second pulley; a thruster system coupled to the first and second hulls; and a computer system comprising one or more processors configured to process the sensor data generated by the one or more sensors and control the pair of reels and the thruster system; wherein the first and second umbilical cables may be in signal communication between the one or more sensors and the computer system, the first and second umbilical cables being configured to transfer the sensor data from the submersible inspection sensor sled to the computer system. The upper u-shaped frame may comprise: first and second arms disposed in parallel relation to each other and a first horizontal bar having opposing ends orthogonally joining proximal ends of the first and second arms; wherein the lower u-shaped frame may comprise: third and fourth arms disposed in parallel relation to each other and a second horizontal bar having opposing ends orthogonally joining proximal ends of the third and fourth arms; and wherein the submersible inspection sensor sled may further comprise: a plurality of vertical bars coupled to the upper and lower u-shaped frames; and a plurality of guide bars coupled to the upper and lower u-shaped frames and disposed in a substantially vertical manner, wherein the plurality of guide wheels may be rotatably coupled to opposing ends of the plurality of guide bars. The first and second reeling arms may be davit arms. The first and second reeling arms may be first and second support rails disposed in parallel relation to each other and fixedly coupled to the first and second hulls, respectively. The first and second reeling arms may be pivotally mounted to the base frame and may be telescoping in length. The one or more sensors may be selected from the group of sensors, consisting of: a camera, a sonar, and a laser scanner.

It is an object to provide a pile inspection system, apparatus, and method that are safer to employ and relatively inexpensive than current and conventional pile inspection methods (e.g., pile inspection methods involving a human diver).

It is an object to provide a safer and cost effective means to perform pile inspections for: (1) deep pilings (i.e., those deeper than 100 feet of seawater (fsw), which generally require a recompression chamber for human diver inspection), (2) those in remote locations having significant costs to mobilize a human dive team; and (3) in environments where traditional remotely operated vehicles do not provide a safe and cost effective production rate.

It is an object to provide a system that may utilize various sensors (e.g., visual cameras, ultra-short-range sonars, ultra-high resolution imaging sonars, laser scanners, or other inspection sensors) for pile inspection in deep (excess 100 fsw) or remotely located pilings (more than three-hour transit to recompression chamber) in zero-visibility and other challenging conditions.

It is an object to provide a pile inspection system that may perform visual and sonar underwater inspection of deep structural piles or walls. The pile inspection system generally utilizes a sled or vehicle having a variety of sensors for inspecting piles and walls underwater. The pile inspection platform and methods may also utilize ultra-high resolution (high frequency) ultra-short-range imaging sonars of deep or remotely located pilings, in zero-visibility conditions.

It is an object to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The drawings are illustrative embodiments. They do not illustrate all embodiments. They do not set forth all embodiments. Other embodiments may be used in addition or instead. Details, which may be apparent or unnecessary, may be omitted to save space or for more effective illustration. Some embodiments may be practiced with additional components or steps and/or without the components or steps, which are illustrated. When the same numeral appears in different drawings, it is intended to refer to the same or like components or steps.

DESCRIPTION OF ILLUSTRATIVE EMBODIMENTS

Figure 1A:
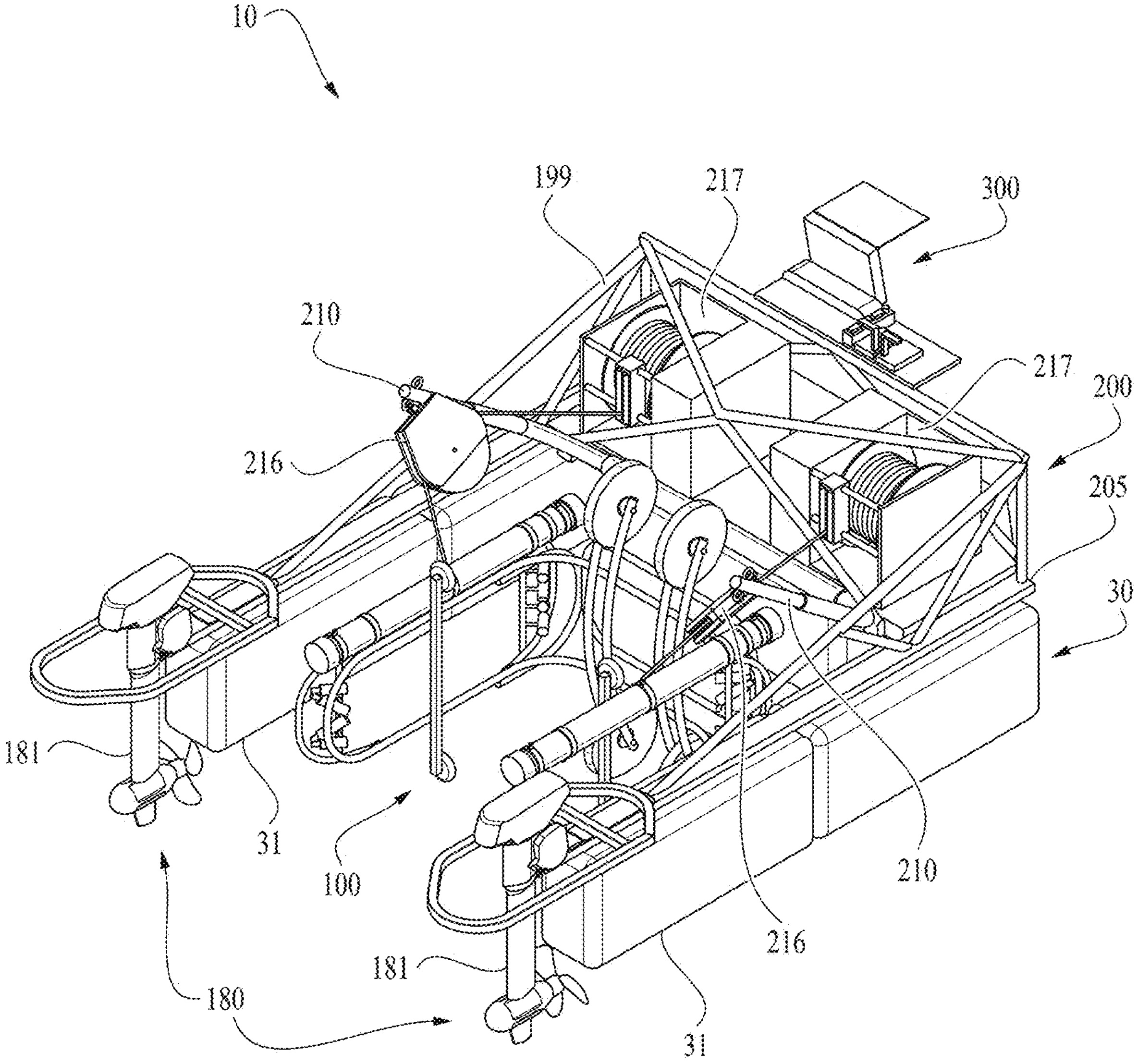
FIGS. 1A and 1B are illustrations of a perspective view of one embodiment of a floating inspection sensor elevator system and shows the submersible inspection sensor sled in the stowed configuration and deployed configuration, respectively.

In the following detailed description, numerous specific details are set forth to provide a thorough understanding of various aspects of one or more embodiments of the floating inspection sensor elevator system. However, these embodiments may be practiced without some or all these specific details. In other instances, well-known methods, procedures, and/or components have not been described in detail so as not to unnecessarily obscure the aspects of these embodiments.

Before the embodiments are disclosed and described, it is to be understood that these embodiments are not limited to the structures, process steps, or materials disclosed herein, but is extended to equivalents thereof as would be recognized by those ordinarily skilled in the relevant arts. It should also be understood that the terminology used herein is used for the purpose of describing embodiments only and is not intended to be limiting.

Reference throughout this specification to “one embodiment,” “an embodiment,” or “another embodiment” may refer to a particular feature, structure, or characteristic described in connection with the embodiments of the present disclosure. Thus, appearances of the phrases “in one embodiment” or “in an embodiment” in various places throughout this specification may not necessarily refer to the same embodiment.

Furthermore, the described features, structures, or characteristics may be combined in any suitable manner in various embodiments. In the following description, numerous specific details are provided, such as examples of materials, fasteners, sizes, lengths, widths, shapes, etc. . . . , to provide a thorough understanding of the embodiments. One skilled in the relevant art will recognize, however, that the scope of the disclosed embodiments can be practiced without one or more of the specific details, or with other methods, components, materials, etc., In other instances, well-known structures, materials, or operations are generally not shown or described in detail to avoid obscuring aspects of the disclosure.

DEFINITIONS

In the following description, certain terminology is used to describe certain features of the embodiments of the floating inspection sensor elevator system in accordance with the present disclosure. For example, as used herein, unless otherwise specified, the term “substantially” refers to the complete, or nearly complete, extent or degree of an action, characteristic, property, state, structure, item, or result. As an arbitrary example, an object that is “substantially” surrounded would mean that the object is either completely surrounded or nearly completely surrounded.

The exact allowable degree of deviation from absolute completeness may in some cases depend on the specific context. However, the nearness of completion will be to have the same overall result as if absolute and total completion were obtained.

The use of "substantially" is equally applicable when used in a negative connotation to refer to the complete or near complete lack of an action, characteristic, property, state, structure, item, or result. As another arbitrary example, a composition that is "substantially free of" particles would either completely lack particles, or so nearly completely lack particles that the effect would be the same as if it completely lacked particles. In other words, a composition that is "substantially free of" an ingredient or element may still actually contain such item if there is no measurable effect thereof.

As used herein, the terms "computer", "computer system," and "processor" may refer to any device, component, or machine that processes data or information with an integrated circuit chip or processor, including without limitation, personal computers, mainframe computers, workstations, processing units, testing equipment, analog oscilloscopes, digital oscilloscopes, servers, desktop computers, portable computers, laptop computers, embedded computers, wireless devices including cellular phones, personal digital assistants, tablets, tablet computers, smartphones, portable game players, and hand-held computers.

As used herein, the terms "application," "software," and "software application" generally refer to any set of machine-readable instructions on a client machine, web interface, computer system, and/or apparatus that directs a processor to perform specific steps, processes, or operations disclosed herein. The "application," "software," and "software application" may comprise one or more modules that direct the operation of the processor, apparatus, or computer system on how to perform the method(s) disclosed herein. For purposes of this specification, a module may be implemented as a hardware circuit comprising custom VLSI circuits or gate arrays, off-the-shelf semiconductors such as logic chips, transistors, or other discrete components. A module may also be implemented in programmable hardware devices such as field programmable arrays, programmable array logic, programmable logic devices, and the like. Modules may also be implemented in software for execution by various types of processors. An identified module of executable code may, for instance, comprise one or more physical or logical blocks of computer instructions, which may, for instance, be organized as an object procedure, or function.

As used herein, the term "interface device" refers to a mouse, touchpad, touchscreen, joystick, trackball, keyboard, and the like.

As used herein, the terms "computer-readable medium" and "memory unit" refer to any device or component used to store data or information. Examples of such include, without limitation, a computer-readable medium device such as floppy disk, magnetic hard disk drive, universal serial bus (USB) thumb drive, solid state hard disk, secure digital (SD) memory card, and memory such as a memory buffer, flash memory, random access memory (RAM), memory, read-only memory (ROM), optical disk, magneto-optical disk, and register files of a processor. The computer-readable medium and memory unit may be configured to store, for example, various data such as video data, image data, sensor data, and/or the like and one or more machine learning models, and/or code that includes instructions to cause a processor to execute one or more processes or functions such as, data preprocessor, one or more machine-learning models, or the combination thereof.

As used herein, the term "floating vessel" may refer to any watercraft or floating/buoyant structure used for performing pile inspection operations with the floating inspection elevator system and may include, without limitation, boats, hovercrafts, passenger/crew boats, barges, submarines, catamarans, hulls, or any vessel known in the industry.

As used herein, the term "hull" may refer to a main body or frame of a floating structure (or a portion thereof), most of which is configured to go under the water, including without limitation, small waterplane area twin hull (SWATH) vessels and catamarans. In embodiments disclosed herein, a pair of hulls may serve as a floating vessel for the floating inspection sensor elevator system. In various embodiments, each hull may be substantially rectangular, square, round, ellipsoidal, hexagonal or another polygonal shape.

As used herein, the term "pontoon" may refer to floating structure or platform, a set or pair of which may serve as a boat or buoyant vessel. The pontoons may be airtight and hollow to prevent water intrusion, thus providing fixed buoyancy. The pontoons may allow for controlled flooding or dewatering, thus providing variable buoyancy.

As used here, the term "pile" may refer to a rigid, elongate member capable of being driven into the earth and typically used as part of the footing for a structural element such as a building foundation, maritime pier, or highway bridge pier. Piles may be constructed of various materials such as timber, concrete, or steel. The term "pile" may also refer to a post that is driven into the ground beneath water, typically ocean water near a shore where a portion of the pile may be submerged in the earth below the water and a portion may be above the water to support a dock or the like. Piles may include, without limitation, structural piles, batter piles, battered piles, and the like.

As used herein, the term "approximately" may refer to a range of values of 10% of a specific value. For example, the expression "approximately 150 inches" may comprise the values of 150 inches±10%, i.e. the values from 135 inches to 165 inches.

As used herein, the term "about" is used to provide flexibility to a numerical range endpoint by providing that a given value may be "a little above" or "a little below" the endpoint. In some cases, the term "about" is to include a range of not more than about two inches of deviation.

As used herein in this disclosure, the singular forms "a" and "the" may include plural referents, unless the context clearly dictates otherwise. Thus, for example, reference to an "opening" can include reference to one or more of such openings.

The present disclosure relates generally to apparatuses, methods, and systems for inspecting piles, piers, bridges, walls, or similar structures. In general, piles are columns inserted underneath strata to transmit a structural load to the lower level of the subsoil strata and are constructed of various materials such as timber, concrete, or steel. Conventional methods of inspecting piles and piers require a human diver and thus may present significant challenges and expenses. For example, diving deeper depths are inherently less safe compared to diving at shallower depth(s), given that diving below 100 feet of sea water (fsw) generally increases the hazards of diver decompression sickness. Additionally, diving below 100 fsw requires a diver recompression chamber, which is commonly unavailable at remote locations. As a result, an inspection team may encounter possibly safety issues and incur significant expenses.

Furthermore, during a typical underwater pile inspection, an ROV is relatively slow, and the sensors used during diving or ROV operation also currently require testing by actual divers or ROVs. However, scheduling a dive may be inconvenient for the four to six-person team, or the complex ROV may malfunction resulting in incurring expenses.

The new and improved floating inspection sensor elevator system disclosed herein solves these issues by employing a submersible inspection sensor sled rather than having an actual person dive deep underwater, especially below 100 fsw. Embodiments of the floating inspection sensor elevator system may comprise a base frame and a submersible inspection sensor sled tethered to the base frame. The base frame may be mounted on a floating vessel such as a boat or pair of hulls. Notably, embodiments of the floating inspection sensor elevator system are generally safer, less expensive, and requires less mobilization or operating costs. The floating inspection sensor elevator system may also have a significantly higher production rate and requires a smaller crew size.

Figure 1B:
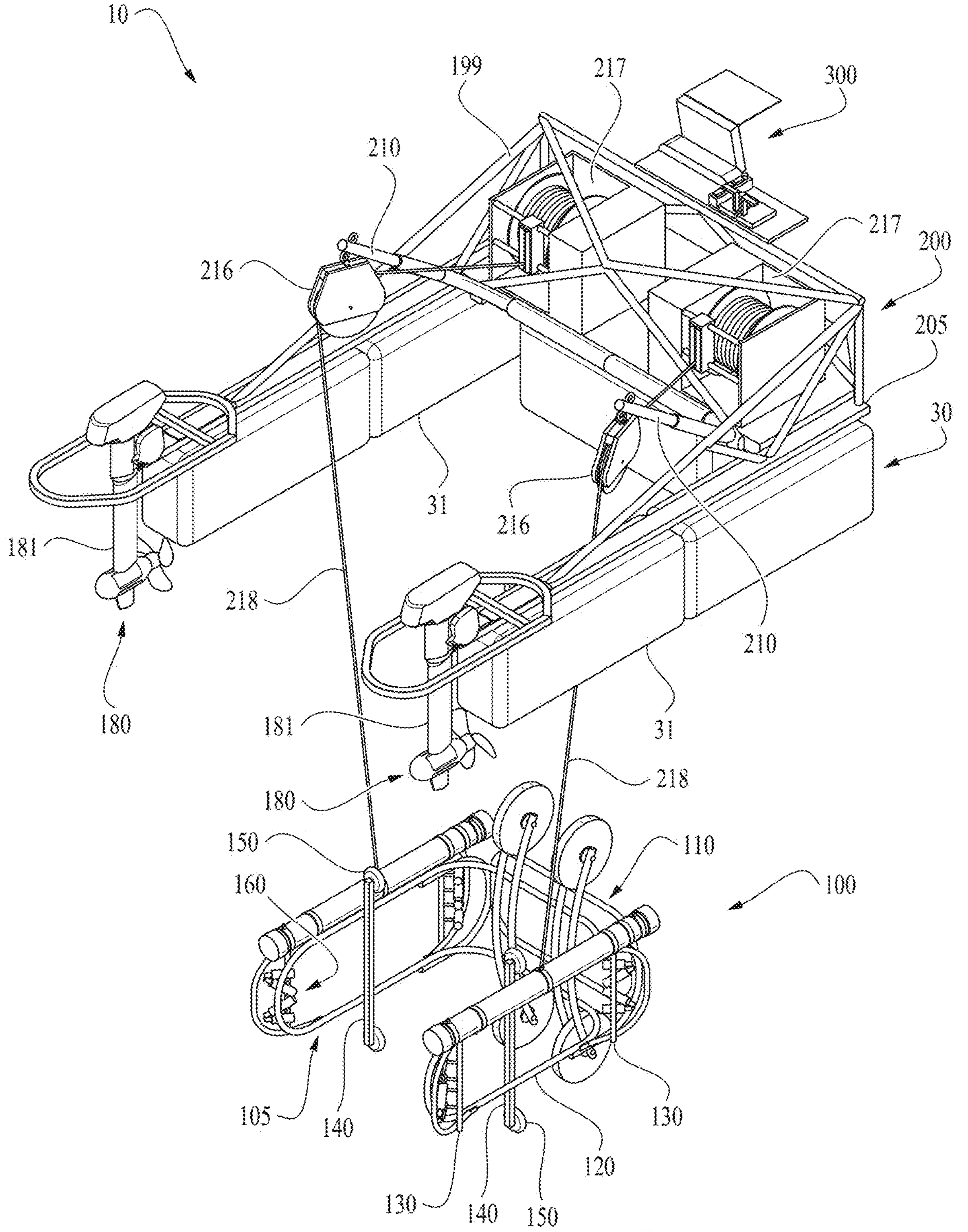

FIGS. 1A and 1B are illustrations of a perspective view of one embodiment of a floating inspection sensor elevator system 10 and shows the submersible inspection sensor sled 100 in the stowed configuration and deployed configuration, respectively. Specifically, FIG. 1A shows the floating inspection sensor elevator system 10 with the submersible inspection sensor sled 100 in the stowed configuration, whereas FIG. 1B shows the floating inspection sensor elevator system 10 with the submersible inspection sensor sled 100 in the deployed configuration.

Figure 2:
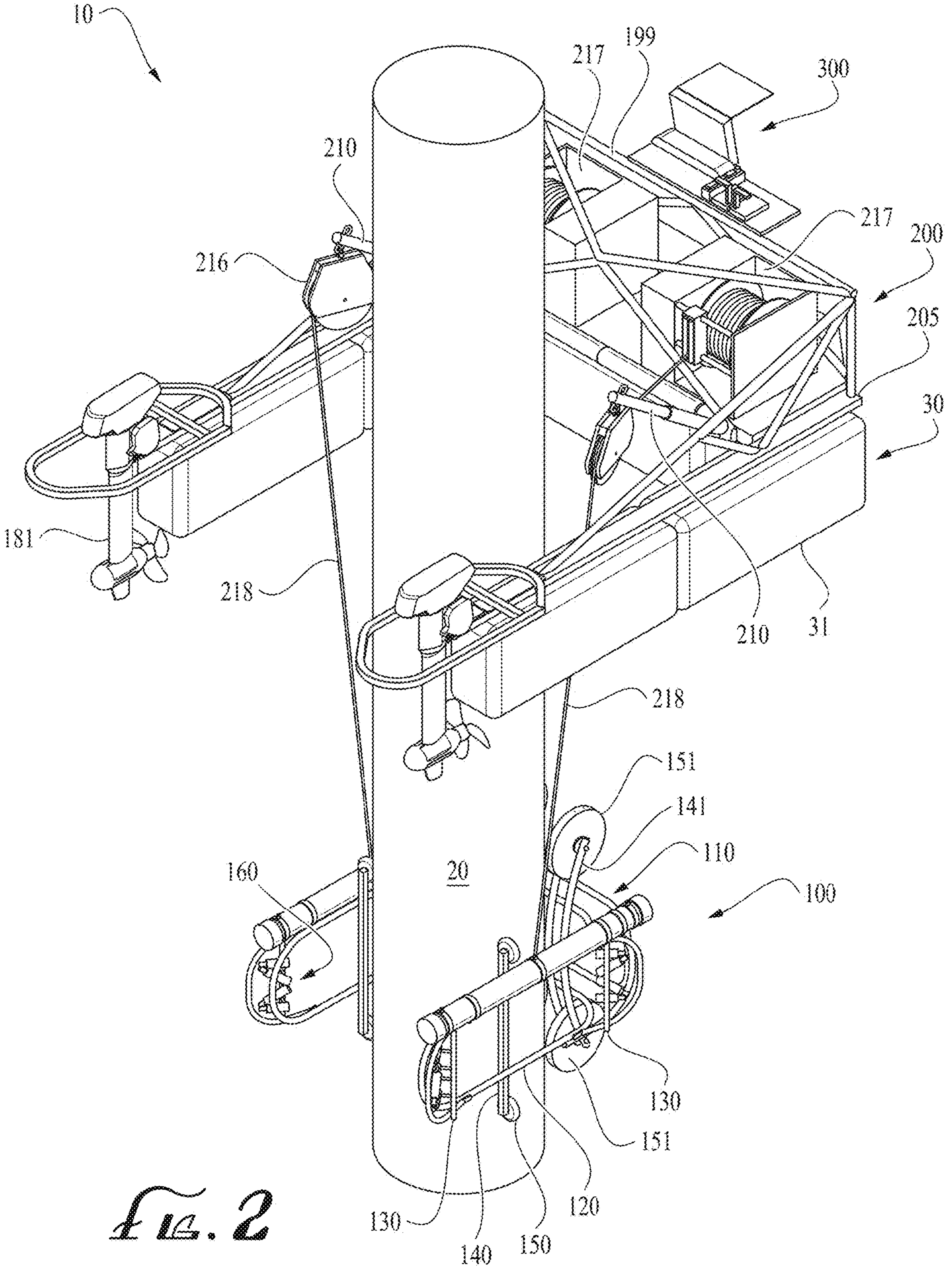
FIG. 2 is an illustration of a perspective view of one embodiment of a floating inspection sensor elevator system and shows the floating inspection sensor elevator system inspecting a pile via a deployed submersible inspection sensor sled.
Figure 3A:
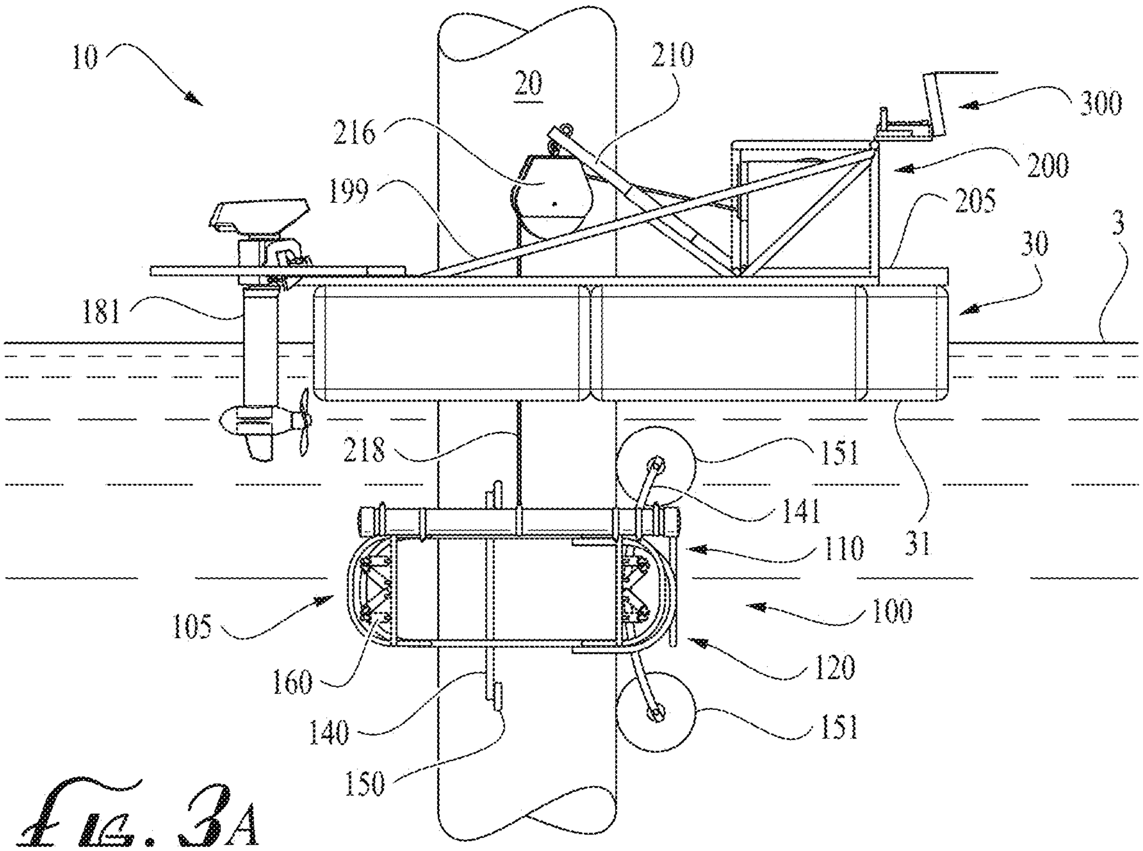
FIGS. 3A and 3B are illustrations of side elevation views of one embodiment of a floating inspection sensor elevator system and shows the submersible inspection sensor sled deployed and engaged with a vertical pile and a batter pile, respectively.
Figure 3B:
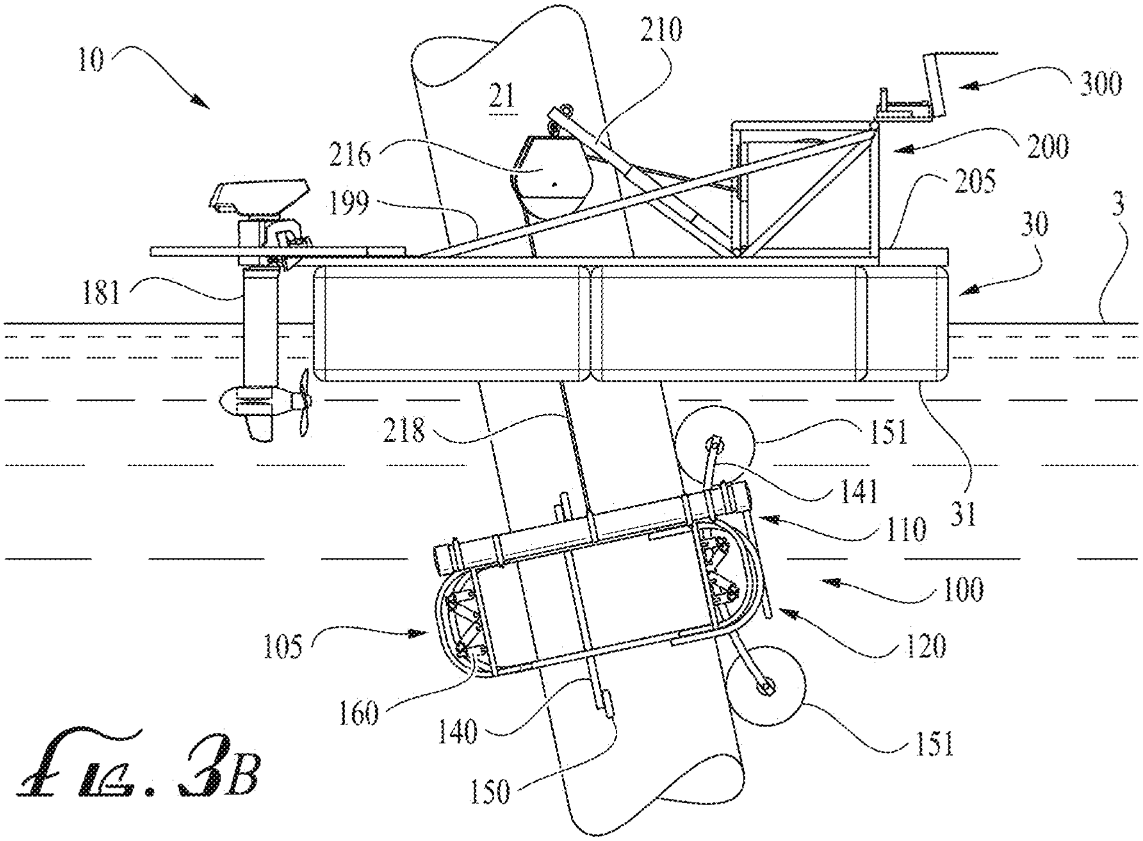

In general, the floating inspection sensor elevator system 10 may be floating platform or system designed to utilize a reelable and submersible sensor array configured for engaging and inspecting piles 20 (shown in FIGS. 2, 3A, and 12), including structural piles 20 and batter piles 21 (shown in FIG. 3B). As shown in FIG. 1, one embodiment of the floating inspection sensor elevator system 10 may comprise: a submersible inspection sensor sled 100 and reeling apparatus 200, computer system 300, and a pair of umbilical cables 218.

The submersible inspection sensor sled 100 may have a u-shaped body, which may be configured to be submerged underwater to engage one or more aspects of a pile 20, 21, and generate sensor data 161 (shown in FIG. 16) via a sensor array. As shown in FIG. 1B, one embodiment of the submersible inspection sensor sled 100 may comprise: a base sled frame 105 having an upper u-shaped frame 110, a lower u-shaped frame 120, vertical bars 130, guide bars 140, 141, guide wheels 150, 151, and one or more sensors 160. The upper u-shaped frame 110 and lower u-shaped frame 120 may be disposed in somewhat parallel relation to each other, and due to their substantially u-shaped design, may be configured to engage a pile 20 for inspection. In some embodiments, the vertical bars 130 may couple the upper and lower u-shaped frames 110, 120 together to promote structural integrity and stability. The guide bars 140, 141 and guide wheels 150, 151 may help guide and slide the submersible inspection sensor sled 100 along the pile 20 at various angles when the submersible inspection sensor sled 100 is pulled or reeled by the reels 217 of the reeling apparatus 200. Additional details and embodiments of the submersible inspection sensor sled 100 are shown and described in detail below.

Figure 4A:
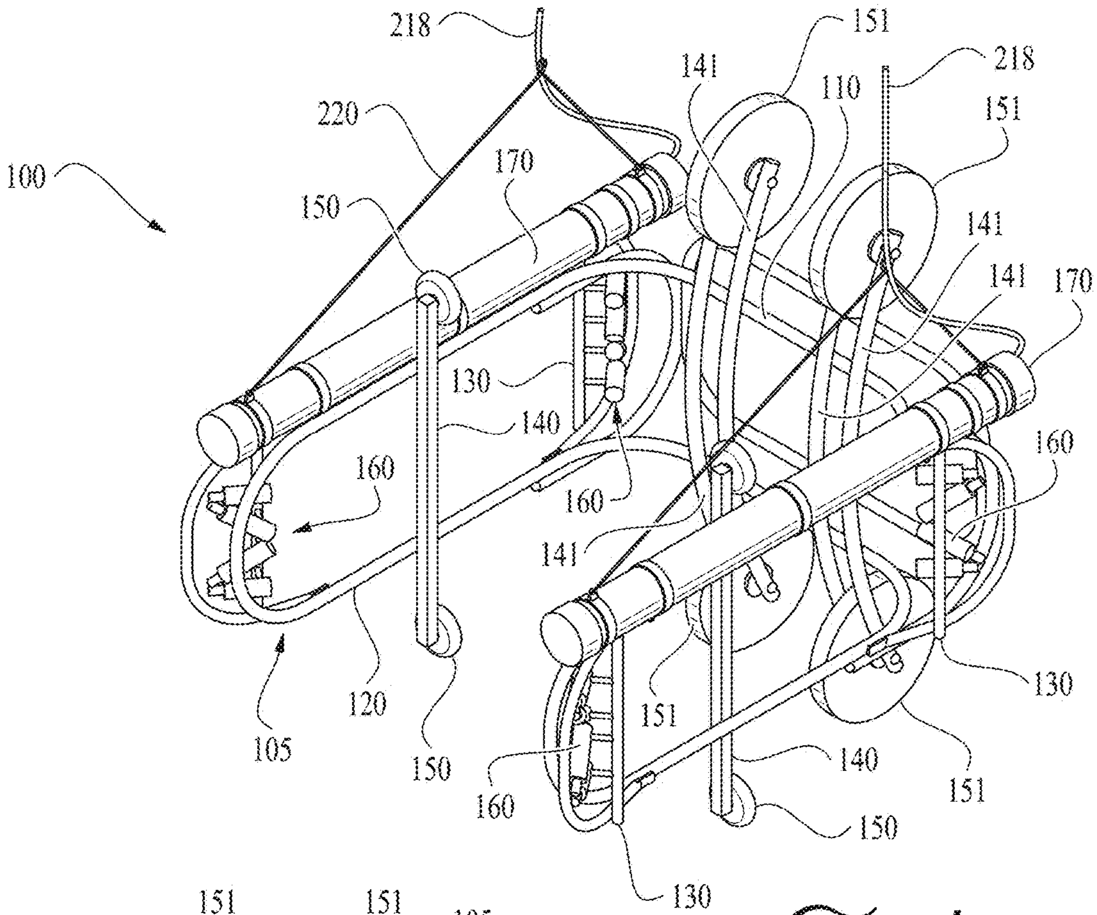
FIGS. 4A to 4D are illustrations of a perspective, top plan, front elevation, and side elevation views, respectively, of one embodiment of the submersible inspection sensor sled.
Figure 4B:
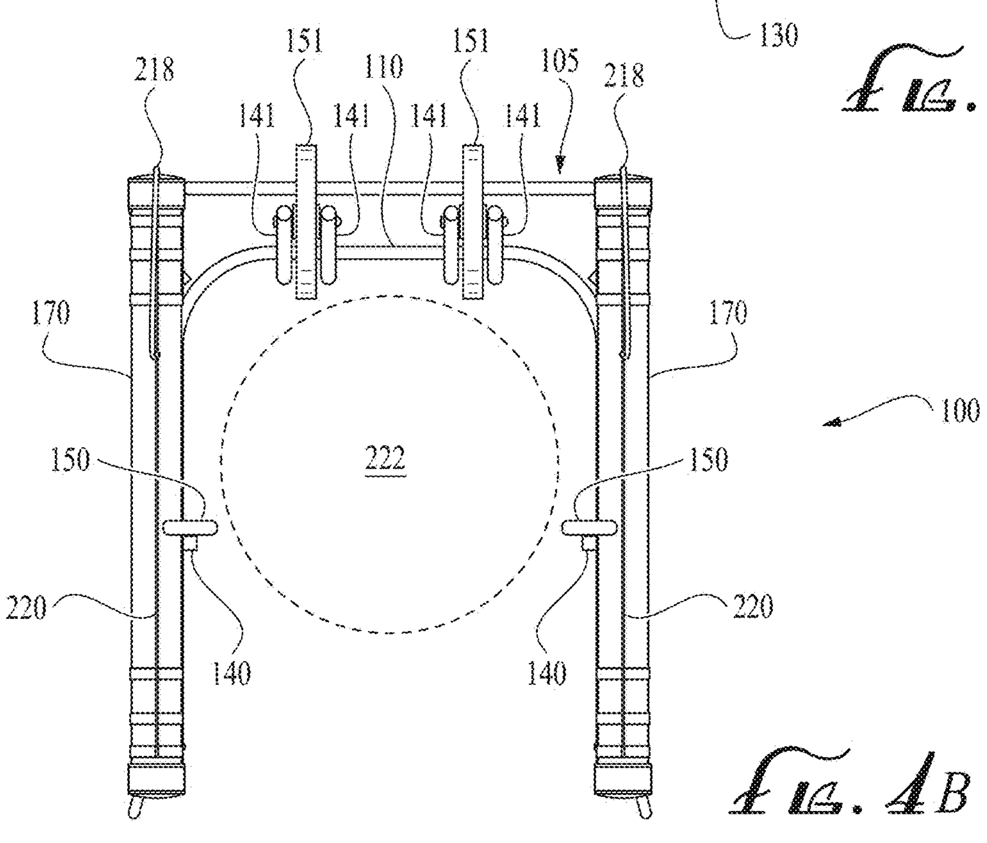
Figure 4C:
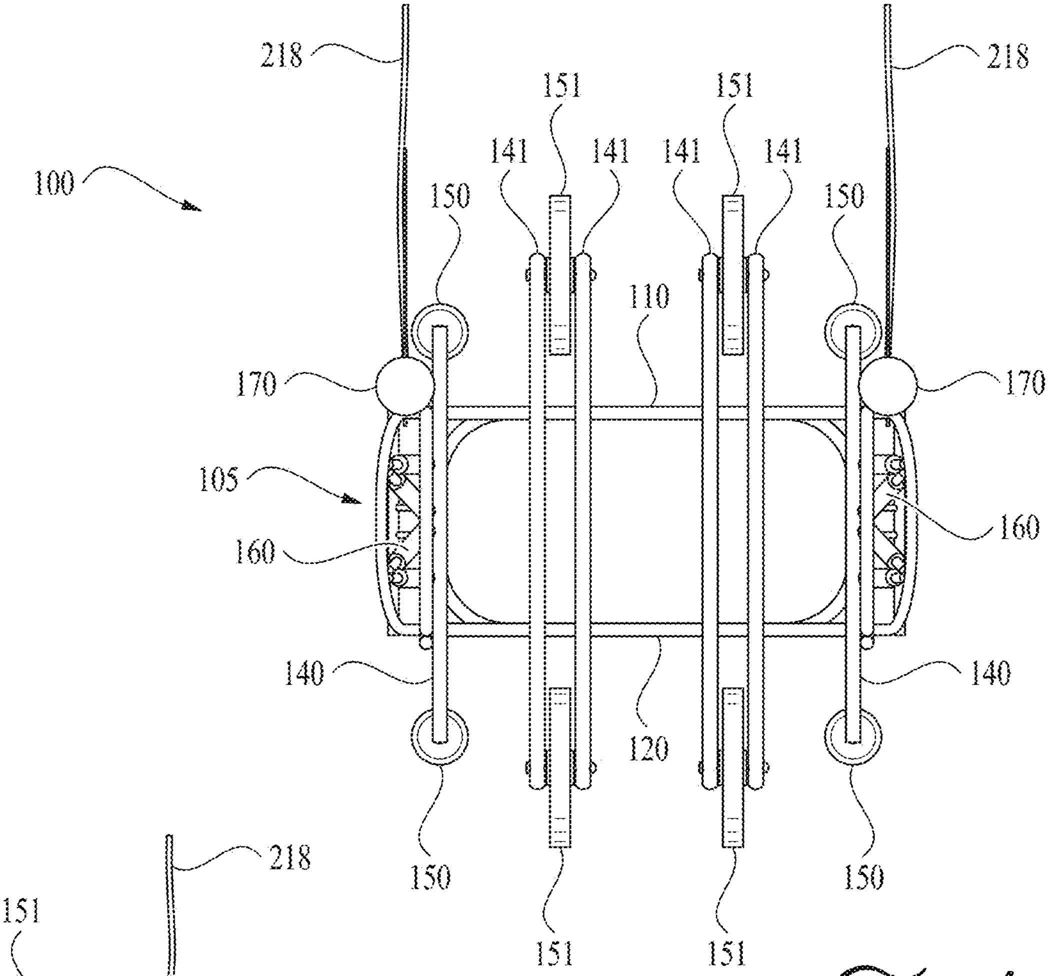
Figure 4D:
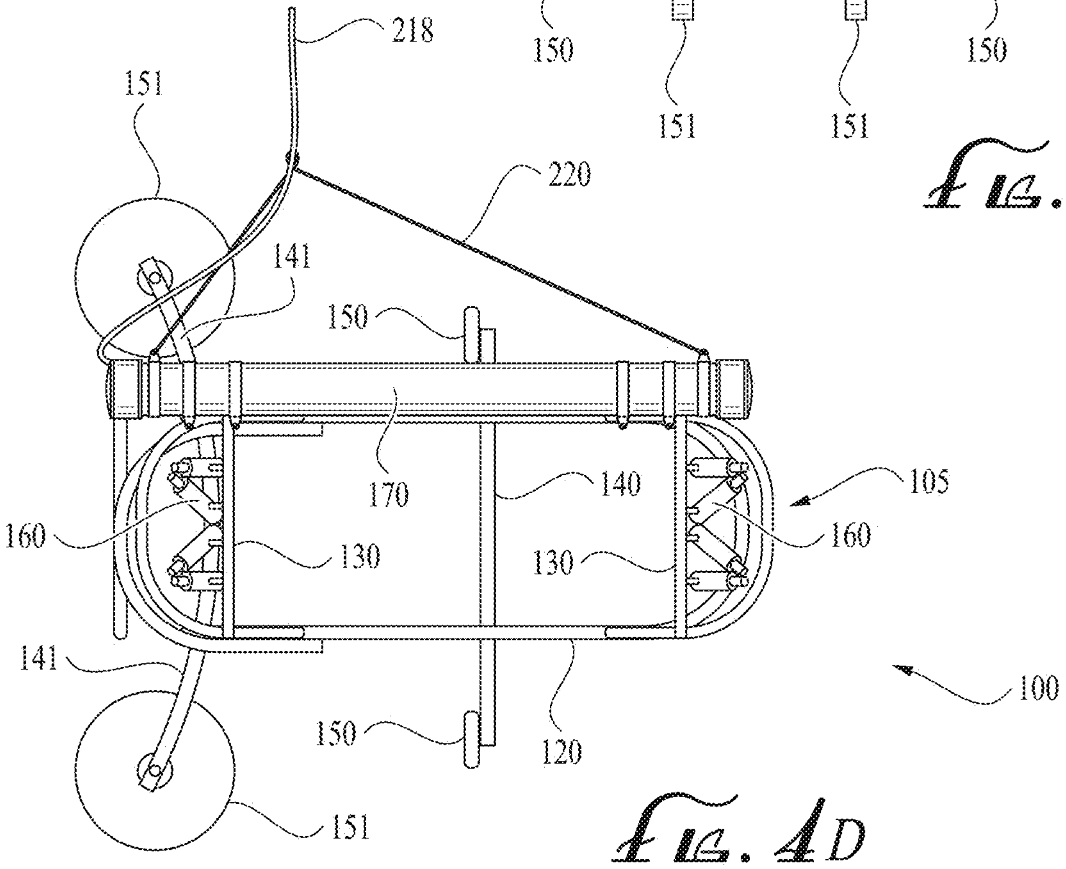

FIG. 1 also shows that the submersible inspection sensor sled 100 may comprise one or more sensors 160, which may couple to or mounted on various areas of the submersible inspection sensor sled 100. For example, FIGS. 1A and 1B show that the sensors 160 may couple to the vertical bars 130 of the submersible inspection sensor sled 100. In other embodiments, the sensors 160 may be directly coupled to the upper u-shaped frame 110, lower u-shaped frame 120, or both. The sensors 160 may be any component or device that detects or measures a physical property of the pile 20 or other structure and outputs corresponding sensor data 161. The sensors 160 may be oriented to focus substantially inwards towards a center area 222 (shown in FIG. 4B) within the arms 111*a*, 111*b*, 121*a*, 121*b* (shown in FIG. 6) of the upper u-shaped frame 110 and lower u-shaped frame 120. Thus, when the submersible inspection sensor sled 100 engages a pile 20, the sensors 160 may inspect one or more aspects of that pile to generate sensor data 161.

Figure 16:
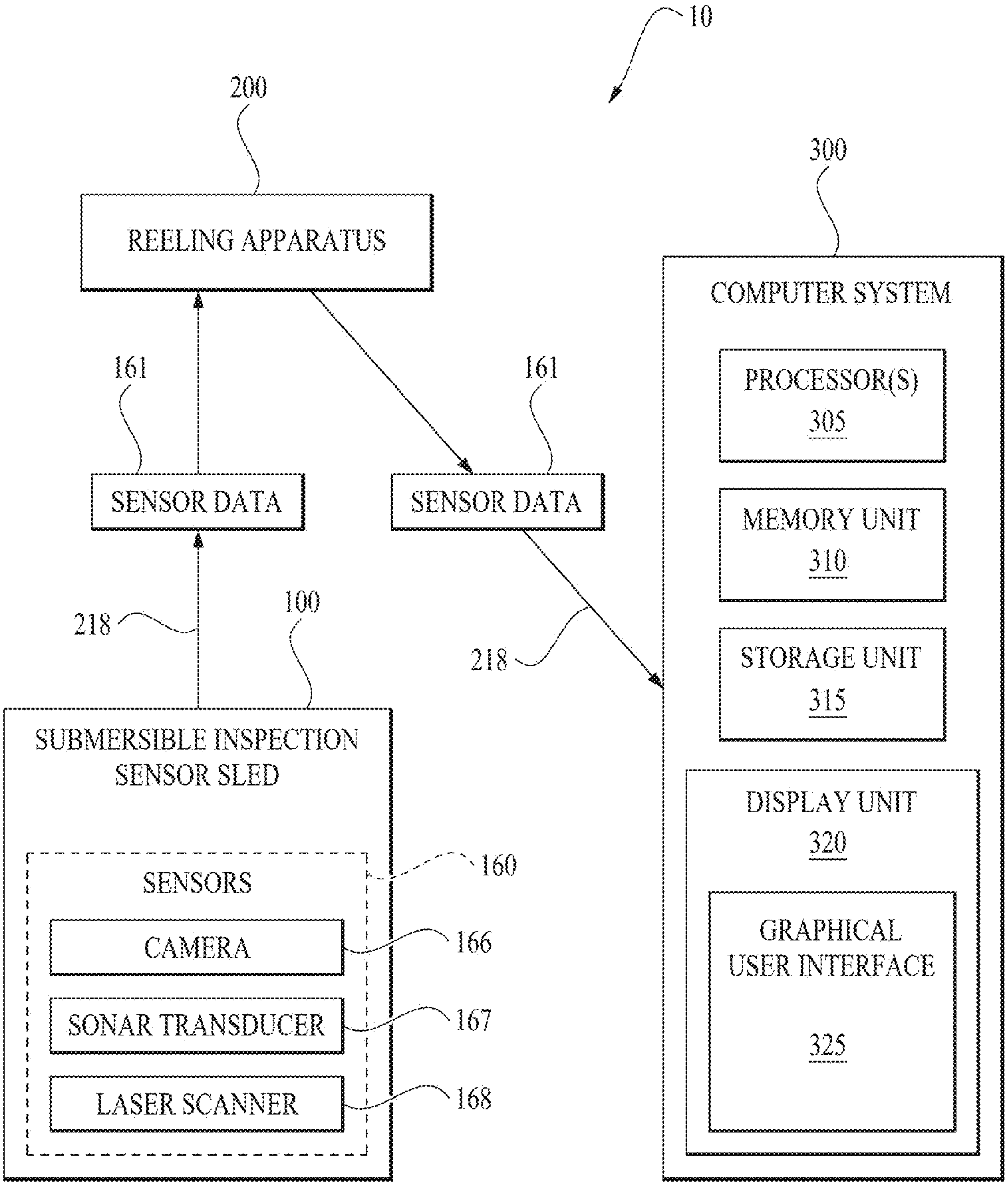
FIG. 16 is a block diagram of one embodiment of the floating inspection sensor elevator system and shows the inner workings of the computer system and the flow of sensor data between the sensors and computer system.

Various embodiments of the sensors 160 may include, without limitation, cameras 166 (shown in FIG. 16), sonars or sonar transducers 167 (shown in FIG. 16), and/or laser scanners 168 (shown in FIG. 16). For example, in exemplary embodiments of the submersible inspection sensor sled 100, the sensor 160 may be a camera 166 configured to create video imagery as sensor data 161. In these embodiments, the submersible inspection sensor sled 100 may also comprise light sources to provide illumination when collecting that sensor data 161. In another embodiment, the sensor 160 may also be a sonar transducer 167 to create sonar or acoustical data as sensor data 161, such that, the sonar transducer may provide ultra-high resolution (high frequency) of deep or remotely located pilings, in zero-visibility conditions. In other embodiments, the sensors 160 may be a laser scanner 168 configured to transmit a laser beam to obtain light or optical data as sensor data 161, as for example subsea LiDAR, and provide a high accuracy underwater inspection and precise optical assessment of the piles 20. In various embodiments the sensors 160 may include a single sensor or multiple sensors that may be combination of the above.

Importantly, FIGS. 1A and 1B also show that the floating inspection sensor elevator system 10 may also comprise a reeling apparatus 200. The reeling apparatus 200 may be configured for rigging to lift, deploy, and reel the submersible inspection sensor sled 100 from a floating vessel 30 and may comprise: a reeling apparatus frame 199, base frame 205, pair of reels 217, pair of reeling arms 210, and pair of umbilical cables 218. The base frame 205 may be any frame structure that is directly mounted onto the floating vessel 30 and provides foundational support to the reeling arms 210, reels 217, umbilical cables 218, and submersible inspection sensor sled 100. The reeling apparatus frame 199 may be a rigid structure that somewhat surrounds or encloses the inner components of the reeling apparatus 200 for further reinforcement or protection thereof.

Figure 11A:
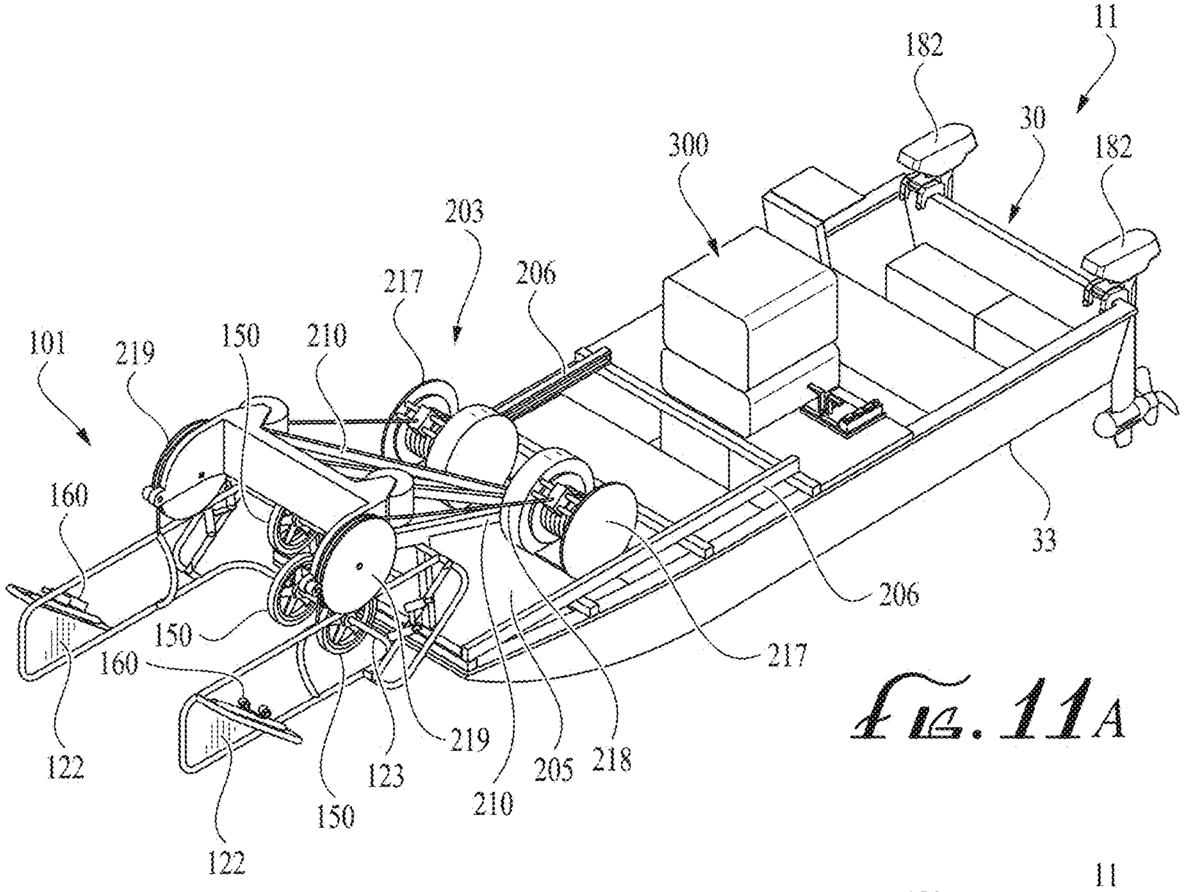
FIGS. 11A and 11B are illustrations of perspective views of another embodiment of the floating inspection sensor elevator system and shows the floating vessel as a boat.
Figure 11B:
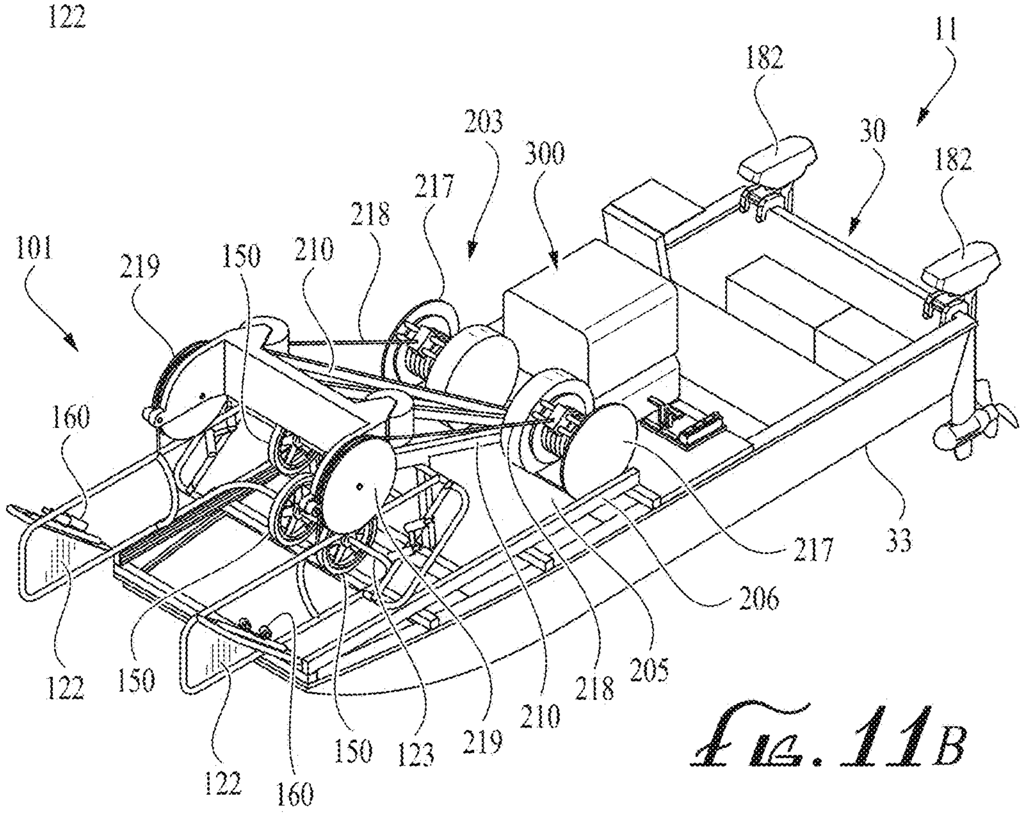
Figure 15:
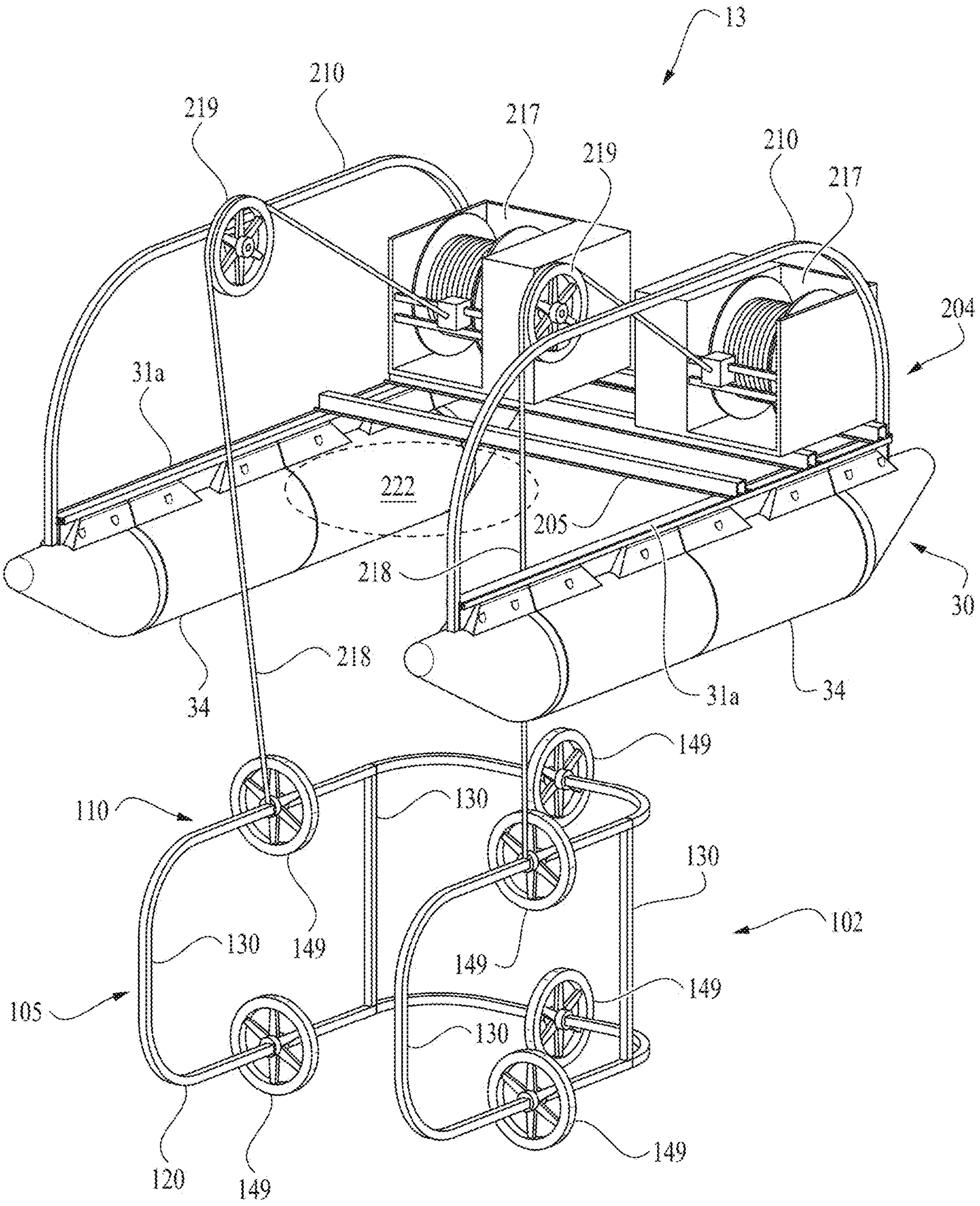
FIG. 15 is an illustration of a perspective view of another embodiment of a floating inspection sensor elevator system and shows the floating vessel as a pair of pontoons.

The floating vessel may be any watercraft or floating/buoyant structure used for mounting and performing pile inspection operations with the floating inspection elevator system 10. Various embodiments of the floating vessel 30 may include, without limitation, boats, hovercrafts, passenger/crew boats, barges, submarines, catamarans, hulls, or any vessel known in the industry. For example, in one embodiment, the floating inspection sensor elevator system 10 may be configured to mount on a floating vessel 30 such as a boat or flat-bottomed vessel, as shown in FIGS. 11A and 11B. In another embodiment, the floating vessel 30 may be a pair of modular hulls 31, as shown in FIGS. 1A-3B and 7-9. Another embodiment of the floating vessel 30 may be a pair of pontoons 34, as shown in FIG. 15. Thus, the floating vessel 30 may be any water or marine platform having floating or buoyant properties.

Notably, FIGS. 1A and 1B show that the floating vessel 30 may be a pair of hulls 31 serving as a floating structure for the floating inspection sensor elevator system 10. As used herein and described above, the term "hull" may refer to any floating structure or platform, a set or pair of which may serve as a boat or buoyant vessel, including without limitation, small waterplane area twin hull (SWATH) vessels and catamarans. In various embodiments, each hull 31 may be rectangular, square, round, ellipsoidal, hexagonal or another polygonal shape.

FIG. 1 also shows that the reeling apparatus 200 may also comprise reeling arms 210, reels 217, and umbilical cables 218, all of which may serve as a deployment and hoisting system. The reeling arms 210 may provide structural support during a lift/lower function and are typically mounted or coupled to the base frame 205. The reeling arms 210 may also be disposed in parallel relation to each other to provide level orientation of the submersible inspection sensor sled 100 when recovering or deploying. In various embodiments, the reeling arms 210 may be fixedly attached to the base frame 205 and therefore stationary to provide structural support for rigging, whereas in other embodiments, the reeling arms 210 may be davit arms or crane-like arms used to lower and raise the submersible inspection sensor sled 100. Other embodiments of the reeling arms 210 may be pivotally mounted to the base frame 205 and/or telescoping, such that the reeling arms 210 may extend or collapse when needed.

The reeling apparatus 200 may serve as the rigging mechanism and may comprise a pair of pulleys 216, each swivelly mounted near or at the distal ends of the reeling arms 210, pair of reels 217 coupled to the base frame 205, and pair of umbilical cables 218. The reels 217 may be coupled to the base frame 205 along a horizontal rotary axis, as shown, but in other embodiments, may be coupled along a vertical rotary axis, or both. Each umbilical cable 218 may rotatably couple to a reel 217 and may have a distal umbilical cable end coupled to the submersible inspection sensor sled 100, proximal umbilical cable end windable to the reels 217, and an intermediate umbilical cable portion reeved around sheaves of each of the pulleys 216. Exemplary embodiments of each pulley 216 may be swivel sheaves. Also, in an exemplary embodiment, the reeling arms 210, reels 217, and umbilical cables 218 may be disposed in a parallel configuration to promote level orientation of the submersible inspection sensor sled 100 during pile inspection operations.

Furthermore, FIG. 1 shows that the floating inspection sensor elevator system 10 may further comprise a computer system 300. The computer system 300 may be configured to analyze the physical characteristics of a pile 20, 21 based on sensor data 161 obtained from the sensors 160 and generally comprises basic components of a processor 305 (shown in FIG. 16), memory unit 310 (shown in FIG. 16), storage unit 315 (shown in FIG. 16) for storing data, software, and input/output devices (e.g., display unit, data recorder, data storage). The processor 305 may be configured to perform executable instructions (e.g., software) and may comprise circuitry or any processor capable of processing the executable instructions. The memory unit 310 may be configured to store sensor data 161 and instructions and may include storage devices, without limitation, random access memory (RAM), read only memory (ROM), RAM cache, virtual memory. The sensor data 161 within the memory unit 310 may be cleared or ultimately transferred to the storage unit 315, which may include any storage configured to retrieve and store data such as flash drives, hard drives, optical drives, and/or magnetic tape. The memory unit 310 and storage unit 315 may each comprise a computer-readable medium, which stores instructions or programs executable by the processor 305, and a graphical user interface 325 (shown in FIG. 16) may be displayed to the user for the user to analyze the sensor data 161 generated by the sensors 160.

In multiple embodiments, the computer system 300 may also include a display monitor to depict the video images, laser scans, or sonar readings of the pile 20, 21 generated by the sensors 160. The computer system 300 may also comprise a display unit and graphical user interface 325 for the user to analyze the sensor data 161. Cameras located throughout the floatation inspection sensor elevator system 10 may provide multiple areas of coverage. For example, in one embodiment, the viewing station may be a COTS multi-camera viewing station, where the primary viewing and/or recording is either focused on the floating vessel 30 and/or substantially inwards towards a center area 222 within the arms 111*a*, 111*b*, 121*a*, 121*b* (shown in FIG. 6) of the submersible inspection sensor sled 100.

Additionally, other embodiments of the computer system 300 may include controls or additional functions for controlling the reeling apparatus 200. For example, the floating inspection sensor elevator system 10 of this embodiment may be controlled directly by an operator physically present on the floating vessel 30 or remotely from a distance via tether, as for example, by a diver in the water, operator on the pier, or from a secondary floating vessel 30 or boat. Regarding remote controls, the computer system 300 may be controlled wirelessly from a proximate distance or location (e.g., second ship, vessel, watercraft, pier) or may be controlled via tether by a second user (e.g., diver). In various embodiments, the computer system 300 may also be configured to control a thruster system if installed onto the floating vessel 30.

In addition to being used for hoisting and deploying the submersible inspection sensor sled 100, the umbilical cables 218 may be electrically and/or optically coupled between the sensors 160 located on the submersible inspection sensor sled 100 and the computer system 300. In this manner, the umbilical cables 218 may provide signal communication between the sensors 160 and the computer system 300 to transfer sensor data 161 therebetween. In alternative embodiments, additional cables may also be used in conjunction with the umbilical cables 218 to provide additional load and hoisting support.

Finally, FIGS. 1A and 1B show that the floating inspection sensor elevator system 10 may further comprise a thruster system 180, which may control the propulsion and direction of a floating vessel 30. The thruster system 180 may comprise one or more thrusters 181, each of which may be used to selectively propel the floating vessel 30, and each of the thrusters 181 may be coupled to a bow or stern of the floating vessel 30. For example, in one or more embodiments, electric thrusters 181 may be located at the center or adjacent to lateral sides (i.e., left, right) of each hull 31, while in other embodiments, the thrusters 181 may be located at, near, or adjacent to a side of the bow and/or stern of each hull 31. In the embodiment shown in FIGS. 1A and 1B, a single thruster 181 may be coupled directly in front of the bow of each hull 31, which may help the floating vessel 30 turn the bow and maneuver much quicker in short distances. In alternative embodiments, the thrusters 181 may be located near the stern of the floating vessel 30, which can provide the floating vessel 30 the capability to turn the stern laterally. Still, in other embodiments, thrusters 181 may be located at both the bow and stern, which may allow the stern thrusters to turn, in concert with the bow thruster(s), thereby allowing the boat or floating vessel 30 to rotate on its axis. In these embodiments, the computer system 300 may also be configured to control the thruster system 180, and thus, the direction and propulsion of the floating vessel 30.

Additional embodiments of the floating inspection sensor elevator system 10 may further comprise a power source (e.g., battery, electrical generators, shore power) configured to provide electrical power to the sensors 160, reels 217, and thruster system 180. For examples, embodiments of the floating inspection sensor elevator system 10 may include batteries or a generator located within or on the floating vessel 30. In other embodiments, the floating inspection sensor elevator system 10 may be powered from the dry end or shore via shore power.

FIG. 2 is an illustration of a perspective view of one embodiment of a floating inspection sensor elevator system 10 and shows the floating inspection sensor elevator system 10 inspecting a pile 20 via a deployed submersible inspection sensor sled 100. As shown in FIG. 2, an embodiment of the floating inspection sensor elevator system 10 may comprise: a submersible inspection sensor sled 100, reeling apparatus 200, computer system 300, and thruster system 180, comprising at least one thruster 181 coupled near the bow of each hull 31. FIG. 2 also shows that the floating vessel 30 may be a pair of rectangular hulls 31 with the base frame 205 mounted near the proximal or rear end of both hulls 31, which may create a substantial u-shaped configuration for optimal engagement and inspection of a pile 20.

Importantly, FIG. 2 shows how the floating inspection sensor elevator system 10 may inspect a pile 20. In operation, the floating vessel 30 may navigate towards the pile 20 and position itself in an area where the pile 20 is somewhat located between and near the reeling arms 210. The pile 20 may be between or adjacent to the arms 111*a*, 111*b*, 121*a*, 121*b* of the submersible inspection sensor sled 100, and once positioned, the floating inspection sensor elevator system 10 may deploy the submersible inspection sensor sled 100 into the water. The reels 217 may continue lowering the submersible inspection sensor sled 100 deeper into the water, and once the submersible inspection sensor sled 100 reaches the desired depth, the sensors 160 may begin capturing various aspects of the pile 20 and generate sensor data 161. For example, cameras 166 may capture video imagery of the outer surfaces of the pile 20 while a sonar transducer 167 may capture acoustical data of the pile 20. In other embodiments, a laser scanner 168 may also be used to obtain a precise optical assessment of the pile 20. As the sensors 160 generate sensor data 161, the submersible inspection sensor sled 100 may move along the length of the pile 20 by having the reels 217 control the lowering or lifting of the submersible inspection sensor sled 100 via the umbilical cables 218. As the submersible inspection sensor sled 100 moves along the pile 20, the guide bars 140, 141 and guide wheels 150, 151 together may provide stability when sliding the submersible inspection sensor sled 100 along the pile 20 to obtain better measurements and readings of the pile 20.

FIGS. 3A and 3B are illustrations of side elevation views of one embodiment of a floating inspection sensor elevator system 10 and shows the submersible inspection sensor sled 100 deployed and engaged with a vertical pile 20 and a batter pile 21, respectively. As shown in FIGS. 3A and 3B, embodiments of the floating inspection sensor elevator system 10 may comprise: a submersible inspection sensor sled 100, reeling apparatus 200, computer system 300, and thrusters 181. FIGS. 3A and 3B also show that the reeling apparatus 200 may be mounted on a floating vessel 30, which may be a pair of rectangular hulls 31, as shown.

Notably, FIG. 3A, which is generally a side elevation view of FIG. 2, shows the submersible inspection sensor sled 100 deployed and engaged with a vertical pile 20. As described above, during operation, the floating vessel 30 may navigate to an area where the pile 20 is substantially positioned between and near the reeling arms 210. In doing so, the submersible inspection sensor sled 100 may be deployed into the water 3 at a desired depth, as shown, and begin capturing various aspects of the pile 20 to generate sensor data 161. Importantly, the submersible inspection sensor sled 100 may move substantially vertically along the length of the pile 20 by having the reels 217 control the lowering or lifting of the submersible inspection sensor sled 100 via the reeling apparatus 200. As the submersible inspection sensor sled 100 moves along the pile 20, the guide bars 140, 141 and guide wheels 150, 151 may provide stability to the submersible inspection sensor sled 100 when sliding along the pile 20 to obtain better measurements and readings of the pile 20.

Similarly, FIG. 3B shows the submersible inspection sensor sled 100 deployed and engaged with a batter pile 21. Unlike FIG. 3A, which depicts a traditional vertical pile 20, a batter pile 21 may be driven into the ground at an angle, often to improve lateral stability required to resist seismic, berthing, wave, and wind imparted loads.

Like FIG. 2, the floating vessel 30, during operation, may navigate to an area where the pile 20 is substantially positioned between and near the reeling arms 210. In doing so, the submersible inspection sensor sled 100 may be deployed into the water 3 at a desired depth by having the reels 217 lower the submersible inspection sensor sled 100 via the reeling apparatus 200. The submersible inspection sensor sled 100 may also begin capturing various aspects of the pile 20 to generate sensor data 161. Importantly, the submersible inspection sensor sled 100 may move at an angle along the length of the pile 21, as shown in FIG. 3B. As the submersible inspection sensor sled 100 moves along the pile 21, the guide bars 140, 141 and guide wheels 150, 151 may help provide stability in sliding the submersible inspection sensor sled 100 along the pile 21 to obtain better measurements and readings. Notably, the curved guide bars 141 and large corresponding guide wheels 151 located somewhat at the center of the submersible inspection sensor sled 100 may help counterbalance the tilt or angle of the submersible inspection sensor sled 100 when sliding, as the curved nature of the guide bars 141 may compensate the angular displacement of a batter piles 21.

FIGS. 4A to 4D are illustrations of a perspective, top plan, front elevation, and side elevation views, respectively, of one embodiment of the submersible inspection sensor sled 100. As shown in FIGS. 4A to 4D, one embodiment of the submersible inspection sensor sled 100 may comprise: a base sled frame 105, vertical bars 130, guide bars 140, 141, guide wheels 150, 151, sensors 160, and appurtenances 170.

The base sled frame 105 may serve as a rigid structure that has a substantial u-shaped body configured to surround or enclose a pile 20, 21 when engaged. The base sled frame 105 may comprise an upper u-shaped frame 110 and lower u-shaped frame 120, comprising tubular or durable bar members, and therefore, is typically dense to promote deployment via sinking, yet lightweight for ease of recovery by hoisting by the reeling apparatus 200. In other embodiments, the base sled frame 105 may be a single unitary structure having a single pair of arms disposed in parallel with at least one horizontal member joining the proximal ends of those arms to create a substantial u-shaped configuration.

FIGS. 4A to 4D show that various embodiments of the submersible inspection sensor sled 100 may also comprise vertical bars 130 that couple the upper and lower u-shaped frames 110, 120 together to promote structural integrity and stability. Similarly, embodiments of the submersible inspection sensor sled 100 may also comprise guide bars 140, 141 and guide wheels 150, 151, to help guide and slide the submersible inspection sensor sled 100 along the pile 20 when the submersible inspection sensor sled 100 is pulled or reeled by the reeling apparatus 200. The guide wheels 150, 151 may be rotatably coupled to various portions of the submersible inspection sensor sled 100. Additionally, various types of guide bars 140, 141 may be used. Additional details of the guide bars 140, 141 and guide wheels 150, 151 are described further below.

Finally, FIGS. 4A to 4D show that the submersible inspection sensor sled 100 may further comprise sensors 160 and appurtenances 170. The sensors 160 may be coupled to various areas of the base sled frame 105 such as the vertical bars 130 and are generally oriented to focus substantially inwards towards a center area 222 within the base sled frame 105. Thus, when the submersible inspection sensor sled 100 engages a pile 20, 21, the sensors 160 may inspect various aspects of that pile 20, 21 to generate sensor data 161. The appurtenances 170 may be storage containers for holding various cabling and equipment associated with the sensors 160. Exemplary embodiments of the appurtenances 170 may contain critical sensor equipment and may be directly and operably coupled to the reels 217 via the cables 218, as shown. In this manner, the appurtenances 170, which may be removably coupled to the base sled frame 105, may easily separate from the base sled frame 105 via breakaway hardware or fasteners in the event of a snag or entanglement.

Figure 5:
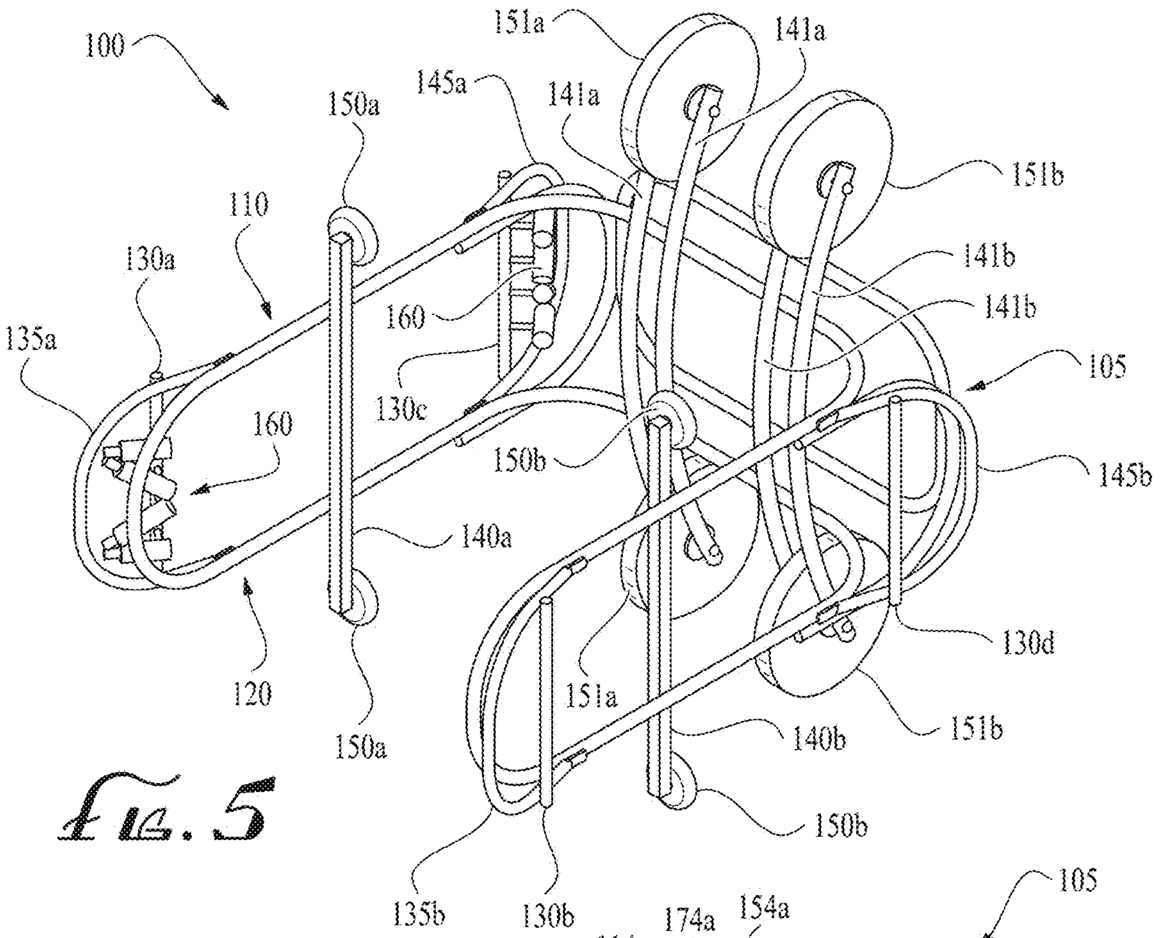
FIG. 5 is an illustration of a perspective view of one embodiment of the submersible inspection sensor sled without the cables and appurtenances.

FIG. 5 is an illustration of a perspective view of one embodiment of the submersible inspection sensor sled 100 without the lifting bridle 220 and appurtenances 170. As shown in FIG. 5, one embodiment of the submersible inspection sensor sled 100 may comprise: a base sled frame 105 having an upper u-shaped frame 110 and lower u-shaped frame 120, vertical bars 130*a*, 130*b*, 130*c*, 130*d*, guide bars 140*a*, 140*b*, 141*a*, 141*b*, guide wheels 150*a*, 150*b*, 151*a*, 151*b*, and sensors 160.

As mentioned above, the vertical bars 130*a*, 130*b*, 130*c*, 130*d* may couple the upper and lower u-shaped frames 110, 120 together to promote structural integrity and stability. For example, in the embodiment shown, the submersible inspection sensor sled 100 may comprise four vertical bars 130*a*, 130*b*, 130*c*, 130*d*. The upper ends of the first pair of vertical bars 130*a*, 130*b* may couple near the distal end of the upper u-shaped frame 110, and the lower ends of that pair of vertical bars 130*a*, 130*b* may likewise couple to the distal end of the lower u-shaped frame 120. Similarly, the upper ends of the second pair of vertical bars 130*c*, 130*d* may couple near the proximal end of the upper u-shaped frame 110, and the lower end of that second pair of vertical bars 130*c*, 130*d* may couple to the proximal end of the lower u-shaped frame 120. In this manner, the positions of the four vertical bars 130*a*, 130*b*, 130*c*, 130*d* may be diametrically opposed to each other with respect the base sled frame 105. Although FIG. 5 shows four vertical bars 130*a*, 130*b*, 130*c*, 130*d* and that the vertical bars 130*a*, 130*b*, 130*c*, 130*d* are positioned somewhat near the four corners of the base sled frame 105, any number of vertical bars may be implemented, and the vertical bars 130*a*, 130*b*, 130*c*, 130*d* may couple to other portions of the upper and lower u-shaped frame 110, 120, as needed.

Notably, FIG. 5 shows that the sensors 160 may mount onto the vertical bars 130*a*, 130*c*, as shown, or in other embodiments may directly couple to the upper u-shaped frame 110, lower u-shaped frame 120, or both. The sensors 160 are typically oriented to focus substantially inwards towards a center area 222 of the base sled frame 105 (i.e., within the upper u-shaped frame 110 and lower u-shaped frame 120). Thus, when the submersible inspection sensor sled 100 engages a pile 20, 21 or similar structure, the sensors 160 may focus directly to the pile 20, 21 to generate sensor data 161.

Regarding the guide bars 140*a*, 140*b*, 141*a*, 141*b* and guide wheels 150*a*, 150*b*, 151*a*, 151*b*, FIG. 5 shows that the guide wheels 150*a*, 150*b*, 151*a*, 151*b* may rotatably couple to the opposing ends of the guide bars 140*a*, 140*b*, 141*a*, 141*b*, and that the guide bars 140*a*, 140*b*, 141*a*, 141*b* may directly couple to the intermediate portions of the upper u-shaped frame 110 and lower u-shaped frame 120, as shown. In this manner, the guide bars 140*a*, 140*b*, 141*a*, 141*b* may promote structural integrity and stability to the base sled frame 105 whereas the guide wheels 150*a*, 150*b*, 151*a*, 151*b* may help facilitate sliding and skidding of the submersible inspection sensor sled 100 along the pile 20, 21 when the submersible inspection sensor sled 100 is pulled or reeled by the reeling apparatus 200.

As described above, in one embodiment, the submersible inspection sensor sled 100 may comprise two types of guide bars 140*a*, 140*b*, 141*a*, 141*b*. In this embodiment, the first pair of guide bars 140*a*, 140*b* may be substantially straight or elongate in length and coupled to the lateral sides of the upper u-shaped frame 110 and lower u-shaped frame 120. The second pair of guide bars 141*a*, 141*b* may couple to the center portions of the upper u-shaped frame 110 and lower u-shaped frame 120 and may be curved to accommodate any forward or rearward tilting of the submersible inspection sensor sled 100 during a pile inspection. Additionally, the first pair of guide wheels 150*a*, 150*b* may also be rotatably coupled to the opposing ends of those first pair of guide bars 140*a*, 140*b*, whereas the second pair of guide wheels 151*a*, 151*b* may be rotatably coupled to the opposing ends of that second pair of guide bars 141*a*, 141*b*. Notably, the second pair of guide wheels 151*a*, 151*b* may be substantially larger than the first pair of guide wheels 150*a*, 150*b*, such that the second pair of guide wheels 151*a*, 151*b* may accommodate the curved shape of the second pair of guide bars 141*a*, 141*b*.

The large guide wheels 151*a*, 151*b* in combination with the curved shape of the second pair of guide bars 141*a*, 141*b* may also help adjust and stabilize the sliding or tilting of the submersible inspection sensor sled 100 during pile inspections, especially when dealing with batter piles 21. Although FIG. 5 shows the submersible inspection sensor sled 100 having only four vertical bars 130*a*, 130*b*, 130*c*, 130*d* and six guide bars 140*a*, 140*b*, 141*a*, 141*b*, various embodiments of the submersible inspection sensor sled 100 may comprise any number of vertical bars and guide bars.

In various embodiments, the guide wheels 150, 151 may be rotatably coupled to various portions of the submersible inspection sensor sled 100. For example, in one embodiment, the guide wheels 150, 151 may rotatably couple to the upper and lower ends of the guide bars 140, 141, but in other embodiments, the guide wheels 150, 151 may be rotatably coupled directly either onto the upper u-shaped frame 110, lower u-shaped frame 120, or both. The guide wheels 150,

151, for example, may share a collinear axis with the upper u-shaped frame 110, lower u-shaped frame 120, or both (i.e., rod/re-bar type frame). If the guide wheels 150, 151 are not collinear to the upper u-shaped frame 110 or lower u-shaped frame 120, alternative embodiments of the guide wheels 150, 151 may be rotatably coupled to various angles and axes to the upper u-shaped frame 110, lower u-shaped frame 120, or guide bars 140, 141 to accommodate/overcome obstructions (e.g., batter piles 21) or lack of under-deck clearance. Other embodiments of the submersible inspection sensor sled 100 may also further comprise skids 140*c* 140*d* (shown in FIG. 13).

Figure 6:
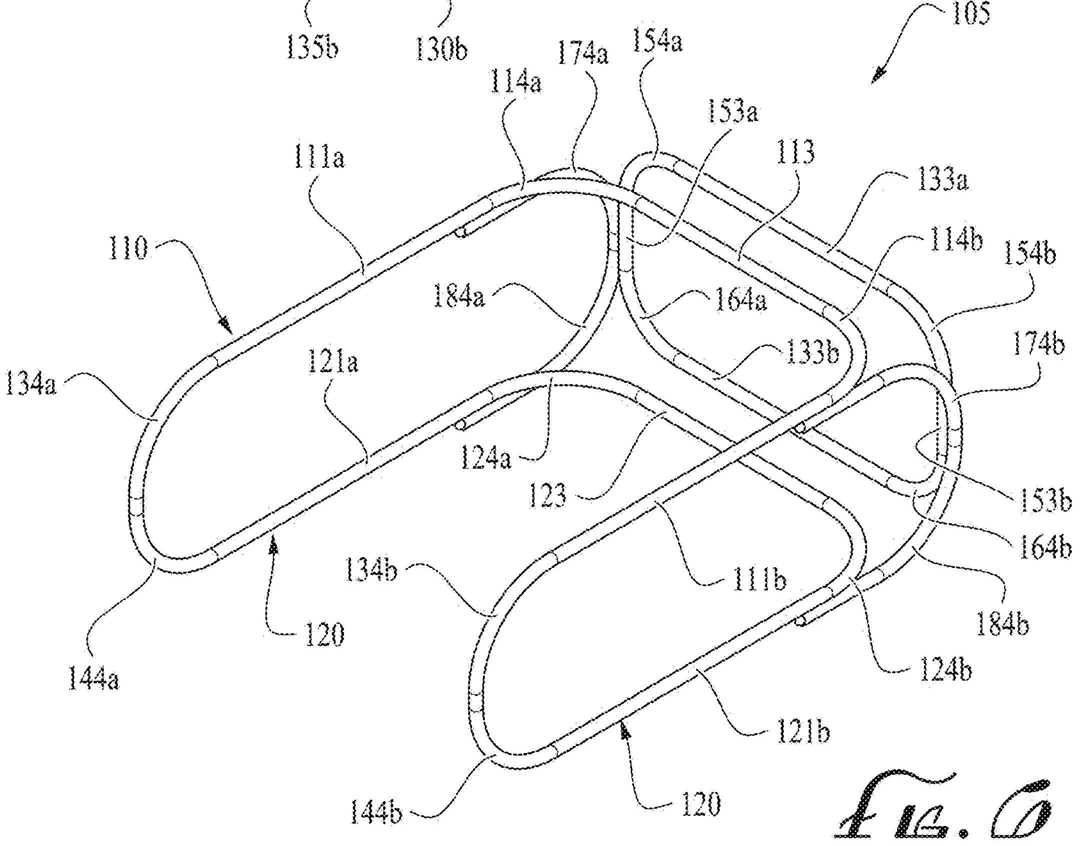
FIG. 6 is an illustration of a perspective view of one embodiment of the base sled frame.

FIG. 6 is an illustration of a perspective view of one embodiment of the base sled frame 105. As shown in FIG. 6, one embodiment of the base sled frame 105 may comprise: an upper u-shaped frame 110 and lower u-shaped frame 120, both disposed in somewhat parallel relation to each other, and curved frame members 114*a*, 114*b*, 124*a*, 124*b*, 134*a*, 134*b*, 144*a*, 144*b*. FIG. 6 shows that, in its basic configuration, the upper u-shaped frame 110 and lower u-shaped frame 120 may each comprise a pair of arms 11*a*, 111*b*, 121*a*, 121*b* and a horizontal bar 113, 123 joining the proximal ends of the arms 11*a*, 111*b*, 121*a*, 121*b*. Additionally, the curved frame members 114*a*, 114*b*, 124*a*, 124*b*, 134*a*, 134*b*, 144*a*, 144*b* may join the opposing ends of the arms 11*a*, 111*b*, 121*a*, 121*b* and horizontal bars 113, 123.

For example, FIG. 6 shows that one embodiment of the upper u-shaped frame 110 may comprise: first and second arms 11*a*, 111*b* disposed in parallel relation to each other and a first horizontal bar 113 having opposing ends somewhat orthogonally joining proximal ends of the first and second arms 111*a*, 111*b* via first and second curved frame members 114*a*, 114*b*. Similarly, an embodiment of the lower u-shaped frame 120 may comprise: third and fourth arms 121*a*, 121*b* disposed in parallel relation to each other and a second horizontal bar 123 having opposing ends somewhat orthogonally joining the proximal ends of the third and fourth arms 121*a*, 121*b* via third and fourth curved frame members 124*a*, 124*b*. The distal ends of the first and second arms 111*a*, 111*b* may join fifth and sixth curved frame members 134*a*, 134*b*, respectively, and distal ends of the third and fourth arms 121*a*, 121*b* may join seventh and eighth curved frame members 144*a*, 144*b*, respectively. The fifth curved frame member 134*a* may join the seventh curved frame member 144*a*, and the sixth curved frame member 134*b* may join the eighth curved frame member 144*b* to create a substantial u-shaped configuration. Various embodiments of the base sled frame 105 may also further comprise additional horizontal bars 133*a*, 133*b*, additional curved frame members 154*a*, 154*b*, 164*a*, 164*b*, 174*a*, 174*b*, 184*a*, 184*b*, and vertical bars 153*a*, 153*b*, as shown, to provide a rugged and stable frame as well as prevent or minimize entanglements during underwater operations.

In another embodiment, the base sled frame 105 may further comprise additional vertical bars 130*a*, 130*b*, 130*c*, 130*d* joining the distal ends of the arms 11*a*, 111*b*, 121*a*, 121*b* via curved frame members 135*a*, 135*b*, 145*a*, 145*b* (shown in FIG. 5). For example, in this embodiment, the first and second vertical bars 130*c*, 130*b* may have upper ends coupled near the distal ends of the first and second arms 111*a*, 111*b*, respectively, and lower ends coupled near the distal ends of the third and fourth arms 121*a*, 121*b*, respectively. In this manner, the first and second vertical bars 130*a*, 130*b* may join the opposing ends of the upper u-shaped frame 110 to opposing ends of the lower u-shaped frame 120 to increase stability and durability of the base sled frame 105.

The upper u-shaped frame 110 and lower u-shaped frame 120 may be constructed of various materials such as metals, polymers, or various composites. Exemplary embodiments of the upper u-shaped frame 110, lower u-shaped frame 120 (including arms 111*a*, 111*b*, 121*a*, 121*b* and curved frame members 114*a*, 114*b*, 124*a*, 124*b*, 134*a*, 134*b*, 135*a*, 135*b*, 144*a*, 144*b*, 145*a*, 145*b*), for example, may be constructed using electrical metal tubing, which is generally robust, durable, and low-cost. Embodiments of the submersible inspection sensor sled 100 may also be constructed through various means such as: bent and welded construction; bent and bolted construction; or may be prefabricated via COTS. The upper u-shaped frame 110, lower u-shaped frame 120, and curved frame members 114*a*, 114*b*, 124*a*, 124*b*, 134*a*, 134*b*, 135*a*, 135*b*, 144*a*, 144*b*, 145*a*, 145*b* may be constructed with various tubing materials, including without limitation, square cross-section perforated tubing (e.g., Telespar® tubing), round cross-section perforated type tubing, common reinforcing bar tubing (i.e., re-bar), and the like.

The base sled frame 105 may have various dimensions, so long as the width of the base sled frame 105 and length of the arms 111*a*, 111*b*, 121*a*, 121*b* provides sufficient clearance to substantially enclose or engage a pile 20, 21. For example, various embodiments of the base sled frame 105 may have a length between approximately 40 inches and 70 inches, a width between approximately 20 inches and 70 inches, and a height between approximately 15 inches and 60 inches. In an exemplary embodiment, the base sled frame 105 may have a length of approximately 48.5 inches, a width of approximately 25⅜ inches, and a height of approximately 19⅜ inches.

Figure 7:
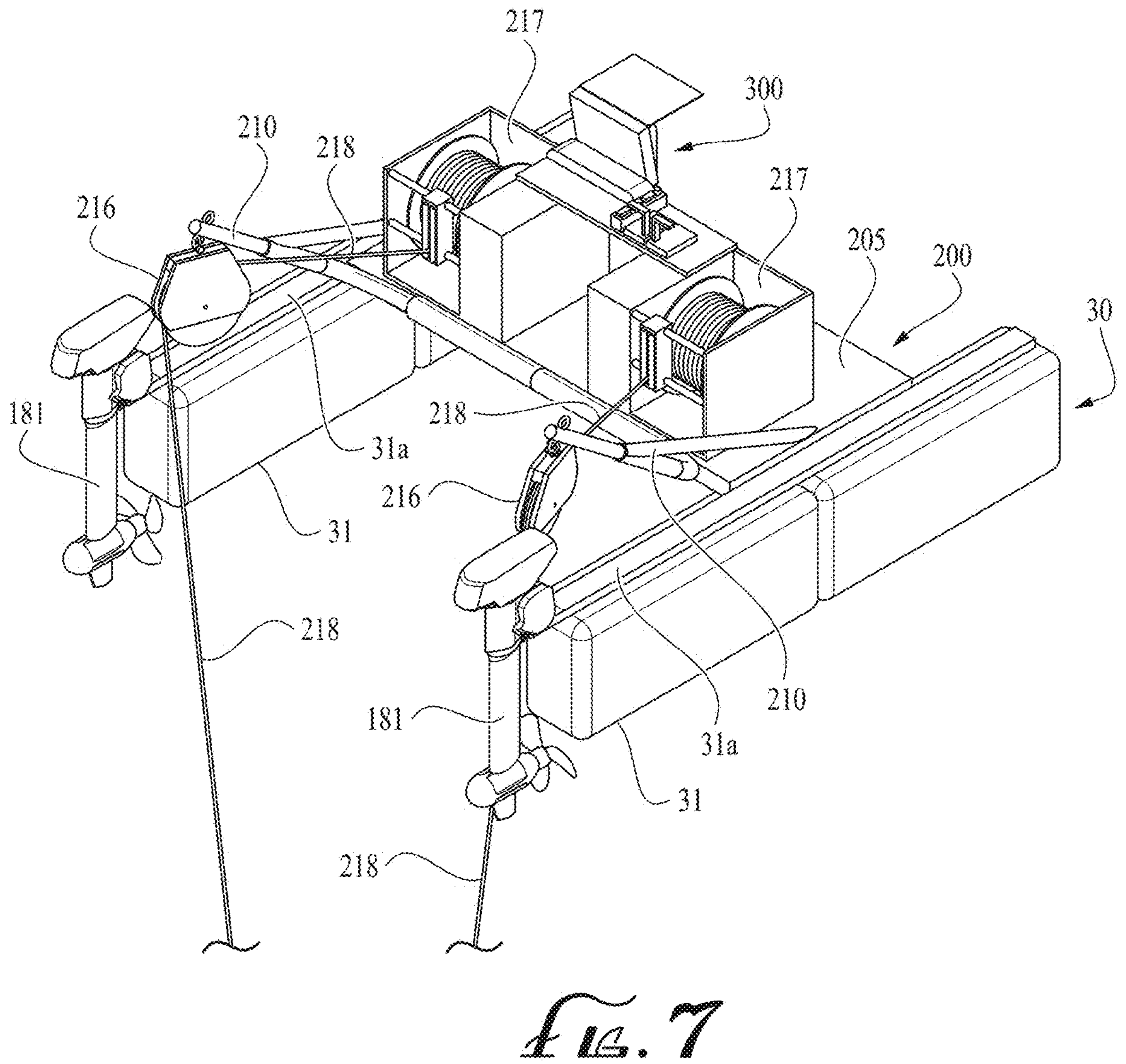
FIG. 7 is an illustration of a perspective view of one embodiment of the reeling apparatus mounted on a floating vessel without a reeling apparatus frame.

FIG. 7 is an illustration of a perspective view of one embodiment of the reeling apparatus 200 mounted on a floating vessel 30 without a reeling apparatus frame 199. As described above, the reeling apparatus 200 may be configured for rigging to hoist, deploy, and reel the submersible inspection sensor sled 100 from a floating vessel 30 and may comprise: a base frame 205, reeling arms 210, pulleys 216, reels 217, and umbilical cables 218. The base frame 205, which is generally a frame structure directly mounted onto the floating vessel 30, may provide support to the reeling arms 210, pulleys 216, reels 217, and umbilical cables 218. The floating vessel 30 may be a pair of rectangular, modular hulls 31, as shown.

In various embodiments, the hulls 31 may have an external perimeter comprising additional impact bars, frames, or bent-tube corners/tubing to reduce the likelihood of snag and minimize impact to the hull 31 itself. The hull configuration may also provide the least amount deck space and minimal clearance required, such that the floating inspection sensor elevator system 10 may be more maneuverable and allow ease of deployment of the submersible inspection sensor sled 100.

In this embodiment, each hull 31 may have a rail 31*a* coupled to a respective hull 31, and the base frame 205 may be mounted near proximal ends of the rails 31*a* or rear ends of the hulls 31. In this manner, the hulls 31, rails 31*a*, and base frame 205 may have a substantially u-shaped configuration as shown for additional support of the submersible inspection sensor sled 100 to help engage or substantially surround a pile 20, 21 for inspection, if needed. In other embodiments, the width of each hull 31 may also be adjusted or configurable to provide additional stability towards the floating inspection sensor elevator system 10.

In other embodiments, the base frame 205 may further comprise a pair of sliding rails 206 (shown in FIGS. 11A and 11B) mounted to the floating vessel 30. In these embodiments, the base frame 205 may slidably couple to the sliding rails 206 and thus may be configured to slide horizontally along the floating vessel 30. For example, in this embodiment, the base frame 205 may slide towards the proximal end or rear end of the floating vessel 30, which may shorten the deck space of the floating vessel for improved maneuverability and under-pier navigation. Conversely, the base frame 205 may also slide towards the distal end or front end of the floating vessel 30, such that the base frame 205 may extend beyond the bow for deployment of the submersible inspection sensor sled 10. Various embodiments of the sliding rails 206 may include, without limitation, sliding barn-door guide, sliding door roller guides, skate wheel conveyer rails, and the like. Additional mechanisms may also be implemented to overcome or minimize unintended slides caused by waves and currents acting upon the floating vessel 30.

Figure 8:
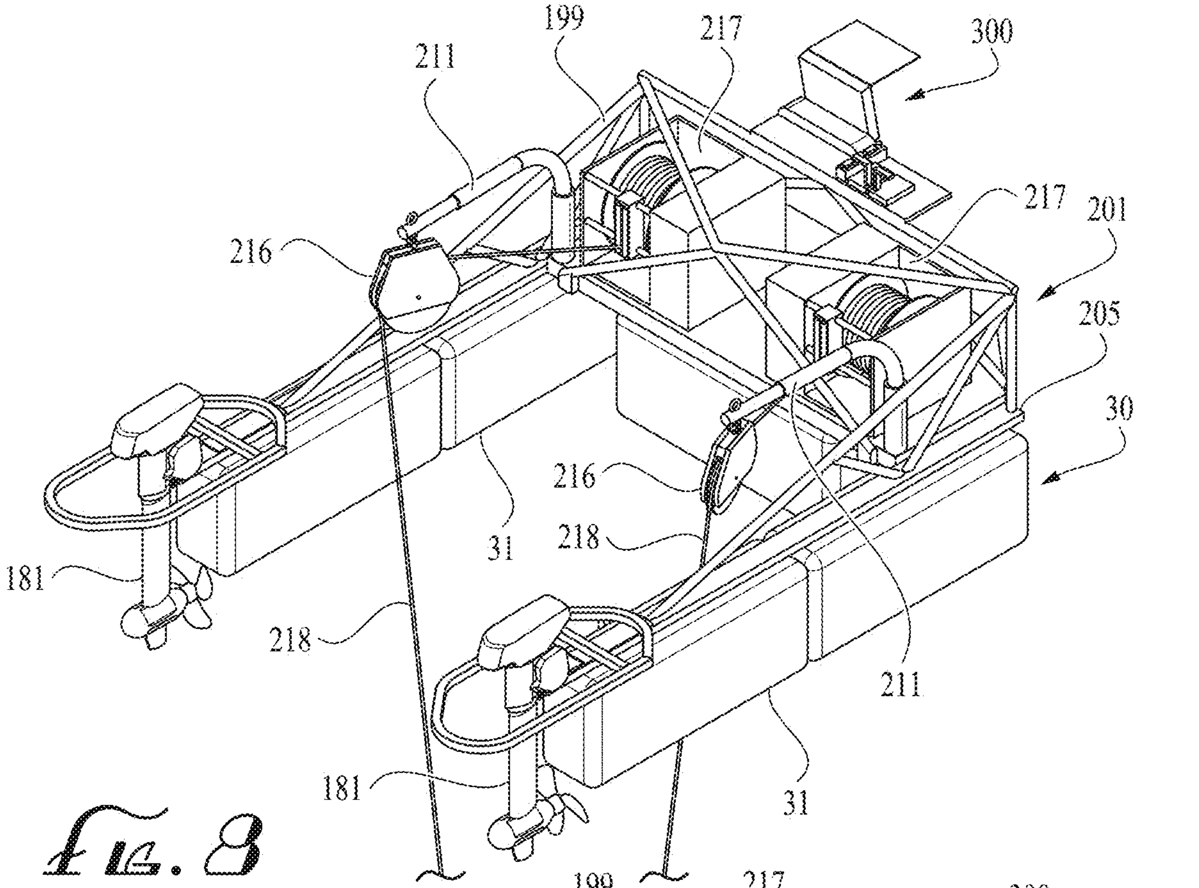
FIG. 8 is an illustration of a perspective view of another embodiment of the reeling apparatus mounted on a floating vessel and shows the reeling arms as davit arms.
Figure 9:
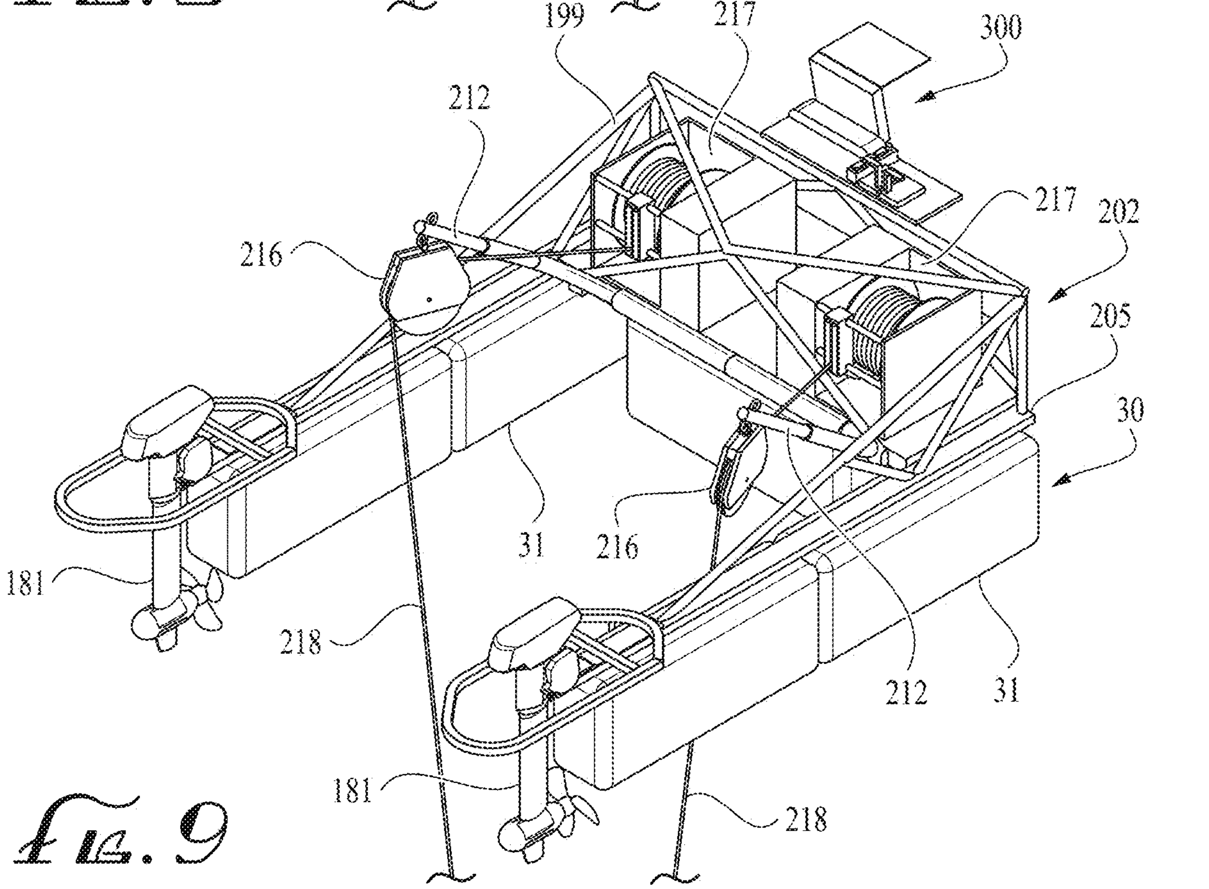
FIG. 9 is an illustration of a perspective view of another embodiment of the reeling apparatus mounted on a floating vessel and shows the reeling arms pivotally mounted to the base frame and are telescoping.

As described above, the reeling arms 210 may provide structural support for the lowering or lifting of the submersible inspection sensor sled 100. The reeling arms 210 may be in parallel relation to each other to provide level attitude of the submersible inspection sensor sled 100 during recovery or deployment. The reeling arms 210 may be fixedly attached to the base frame 205 and thus stationary, as shown in FIG. 7. In another embodiment, the reeling arms 211 may be davit arms or crane-like arms used to lower and raise the submersible inspection sensor sled 100, as shown in FIG. 8. In other embodiments, the reeling arms 212 may be pivotally mounted to the base frame 205 such that, the reeling arms 212 may rotate from approximately 0 degrees to 180 degrees relative to the base frame 205, as shown in FIG. 9. Other embodiments of the reeling arms 212 may also be telescoping, such that the reeling arms 212 may extend or collapse when needed (also shown in FIG. 9).

The reeling apparatus 200 may also comprise pulleys 216 rotatably mounted near or at the distal ends of the reeling arms 210, 211, 212. Each reel 217 may be coupled to the base frame 205, and each umbilical cable 218 may rotatably couple to a reel 217 with an intermediate portion reeved around sheaves of each pulley 216. In an exemplary embodiment, the reeling arms 210, 211, 212, reels 217, and umbilical cables 218 may be disposed in a parallel configuration to promote level attitude of the submersible inspection sensor sled during pile inspection operations.

In some embodiments, the reeling apparatus 200 may further comprise lashings having breakaway connections for ease of disconnection. The lashings may be coupled to various areas of the submersible inspection sensor sled 100 or reeling apparatus 200 for the recovery of expensive equipment or sensors 160 (e.g., cameras 166, light sources, sonar transducers 167, laser scanners 168). Thus, in the event of a snag or entanglement, certain fasteners or cabling may be disconnected to recover expensive components or equipment. Examples of such lashing mechanisms may include fasteners (e.g., zip-ties) comprising perforated or "cross-cut" surfaces to allow release of the submersible inspection sensor sled base frame 105 in the event of snag or entanglement. Other lashing mechanisms may include fasteners having successive "unzipping" type points of failure, as intended/needed to avoid load-sharing (e.g., stretching of lashings or sliding/bunching of the breakaway lashings).

In other embodiments, the reeling apparatus 200 may further comprise additional pulleys, sheaves, wheels, or rollers to further ensure level attitude of the submersible inspection sensor sled 100 when utilizing the reels 217. Examples of such may include pulleys 216 having sheaves with various diameters to redirect the cables 218 to lower fatigue and lengthen the life of the umbilical cables 218.

In multiple embodiments, a computer system 300 may either be located on the floating vessel 30 or at a secondary location (which may be proximate to the reeling apparatus 200). The umbilical cables 218 may also be in electrical communication with the computer system 300. In this manner, the computer system 300 may analyze the physical characteristics of a pile 20, 21 based on sensor data 161 obtained from the sensors 160. In some embodiments, the computer system 300 may also comprise a display monitor to depict various images and readings and a graphical user interface 325 for the user to analyze the sensor data 161 and operate the reeling apparatus 200. For example, the computer system 300 may allow an operator on the floating vessel 30 to directly control the reels 217 for the deployment of the submersible inspection sensor sled 100. In various alternative embodiments, the computer system 300 may be controlled remotely via tether or wirelessly, as for example, a third-party operator located at a proximate location such as a pier or boat. In additional embodiments, the computer system 300 may also be configured to control the thrusters 181 or thruster system 180 if installed on the floating vessel 30.

FIG. 8 is an illustration of a perspective view of another embodiment of the reeling apparatus 201 mounted on a floating vessel 30 and shows the reeling arms 211 as davit arms. As shown in FIG. 8, embodiments of the reeling apparatus 201 may comprise: a base frame 205, reeling arms 211, pulleys 216, reels 217, and umbilical cables 218. Like the previous embodiments, this embodiment of the reeling apparatus 201 may hoist, deploy, and reel the submersible inspection sensor sled 100 from the floating vessel 30 via the reeling arms 211 and umbilical cables 218.

Notably, the reeling arms 211 may be davit arms, which are typically crane-like devices used to lower and raise the submersible inspection sensor sled 100. Unlike fixed reeling arms 210, which are immovable and stationary, davit arms are usually more versatile and efficient, especially in confined spaces. For example, in various embodiments, the davit arms may be configured to swivel, pivot, rotate, or otherwise move with respect to the post in a generally horizontal plane to provide a wide range of motion. Various embodiments of the davit arms can also be configured to extend and swivel back and forth to allow a respective umbilical cable 218 and pulley 216 to have range over a larger area over the floating inspection elevators sensor system.

Like the previous embodiments, the reeling arms 211 may provide structural support when lowering or lifting the submersible inspection sensor sled 100. The reeling arms 211 may also be in parallel relation with respect to each other to provide level attitude of the submersible inspection sensor sled 100 during recovery and deployment. In addition to the davit arms, additional pulleys, sheaves, wheels, or rollers may be used to further ensure level sled attitude, as for example, pulleys having sheaves with various diameters to redirect the cables to lower fatigue and lengthen the life of the umbilical cables 218.

FIG. 9 is an illustration of a perspective view of another embodiment of the reeling apparatus 202 mounted on a floating vessel 30 and shows the reeling arms 212 pivotally mounted to the base frame 205 and are telescoping. As shown in FIG. 9, embodiments of the reeling apparatus 202 may comprise: a base frame 205, reeling arms 212, pulleys 216, reels 217, and umbilical cables 218. Like the previous embodiments, embodiments of the reeling arms 212 shown in FIG. 9 may provide structural support when lowering or lifting the submersible inspection sensor sled 100. These reeling arms 212 may also be in parallel relation with respect to each other to promote level attitude of the submersible inspection sensor sled 100 during recovery and deployment.

Importantly, the reeling arms 212 shown in FIG. 9 may be pivotally mounted to the base frame 205. In this manner, the reeling arms 212 may rotate between approximately 0 degrees and 180 degrees relative to the base frame 205. The reeling arms 212 may also be telescoping, such that the reeling arms 212 may extend or collapse when needed. Therefore, unlike the fixed reeling arms 210, embodiments of the reeling arms 212 shown in FIG. 9 are generally more versatile and may provide a wider range of motion and over a larger area. Other embodiments of the reeling arms 212 may also include other features such as being able to rotate and swivel with respect to the base. Additional pulleys, sheaves, wheels, or rollers may also be used without deviating from the scope of the disclosure.

Figure 10:
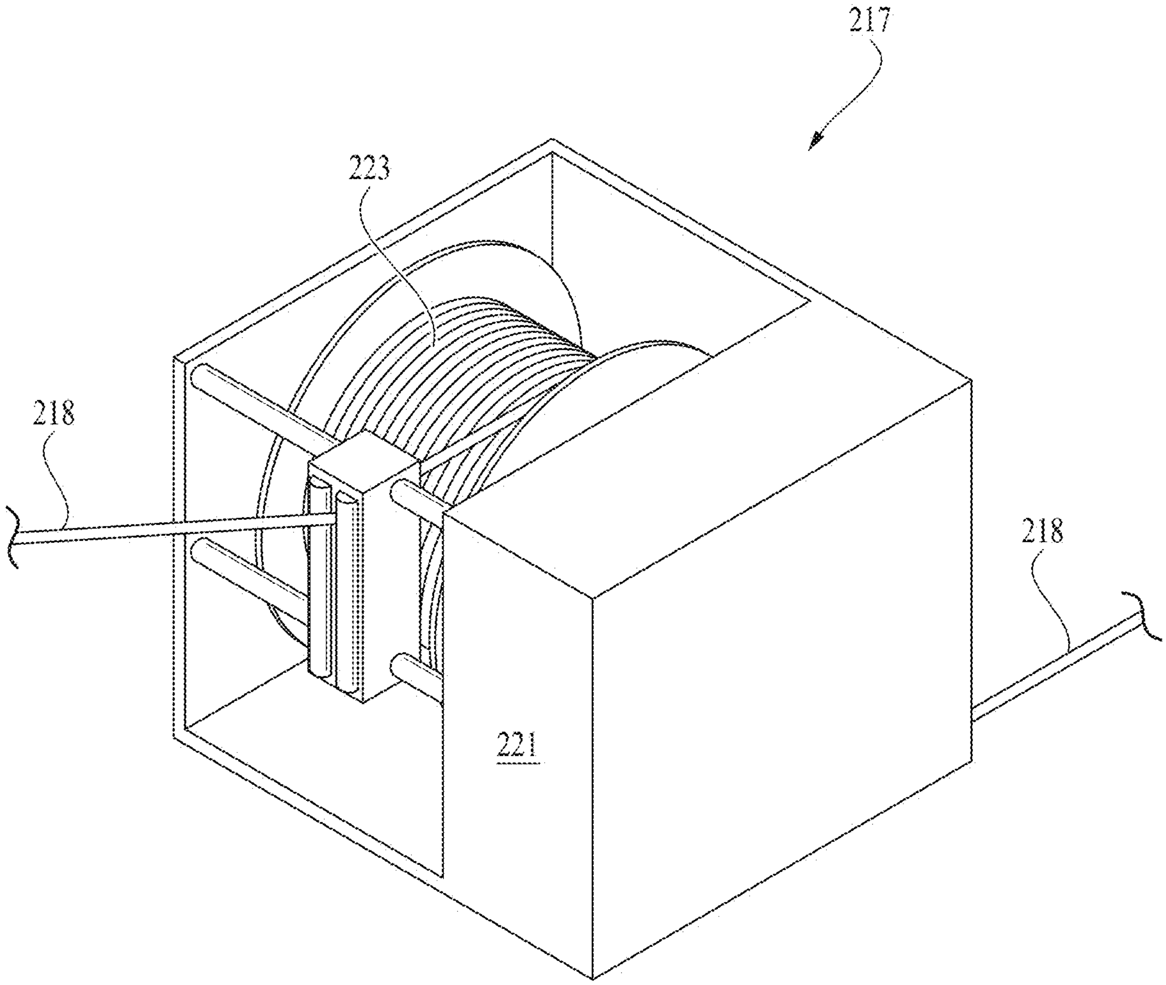
FIG. 10 is an illustration of a perspective view of one embodiment of a reel.

FIG. 10 is an illustration of a perspective view of one embodiment of a reel 217. As recited above, the reel 217 may be a device or structure (e.g., cylinder or drum) configured to carry, wind, and/or control a cable drum 223 to wind the umbilical cables 218 disclosed herein. The reel 217 may comprise a reel motor 221 to rotate the cable drum 223, and the reel motor 221 may be controlled by the operator via the computer system 300.

In several embodiments, the diameter of the cable drum 223 may depend on various factors, such as the bend radius of the umbilical cable 218, the span and height of the reel 217, and the desired maximum number of windings of the umbilical cable 218 around the reel 217. Various embodiments of the reel 217 may utilize multiple slack control mechanisms to prevent excess slack in the cable 218. Other mechanisms may be used to prevent excess slack in the umbilical cable 218 as well as additional motors to collect the umbilical cable 218 and control the angular position of the umbilical cable 218.

For example, in some embodiments, the reels 217 may be smart reels or computer-controlled reels such as the reeling apparatus disclosed in U.S. Pat. No. 9,869,690, issued to Baugh, the contents of which are incorporated in reference in its entirety and sold under the tradename Smart Reel®, a registered trademark of the Reel Power Licensing Corp. Here, unlike a standard reel or reel, the Smart Reel® reeling apparatus may control the lowering and lifting of the submersible inspection sensor sled 100 via the rigging or umbilical cable 218 while controlling the tension of the umbilical cable 218. In other embodiments, the reel 217 may also provide power supply readings to the sensors such as the cameras and lights.

FIGS. 11A and 11B are illustrations of perspective views of another embodiment of the floating inspection sensor elevator system 11 and shows the floating vessel as a boat 33. As shown in FIGS. 11A and 11B, another embodiment of the floating inspection sensor elevator system 11 may comprise: a submersible inspection sensor sled 101 and reeling apparatus 203. Notably, as shown in FIGS. 11A and 11B, the floating vessel 30 may be a boat 33 (e.g., dinghy) configured for mounting the floating inspection sensor elevator system 11 and may comprise one or more motors 182 in lieu of a thruster system 180. As used herein and described above, the term "boat" may refer to any aquatic vehicle or marine watercraft of any size or type including, without limitation, a passenger/crew boat, a dinghy, a sailboat, a yacht, a tanker, a ferry, a barge, a submarine, a catamaran, and the like.

Unlike the hulls 31 or the pontoons 34 described below, the boat 33 may comprise a single hull and a large amount of deck space to provide sufficient room or space for passengers and the submersible inspection sensor sled 101. Additionally, the boat 33 may be large enough to provide sufficient space to include a base station (i.e., computer system 300) and allow one or more passengers to directly perform pile inspection operations on the floating vessel 30. Unlike other floating vessels 30 such as the pontoons 34, embodiments of the boat 33 may include a keel to create additional stability and control of the boat 33 during navigation. In various embodiments, the keel may extend from the bow to the stern of the boat 33 and may provide directional stability and resistance to lateral slippage.

Notably, in this embodiment, the floating inspection sensor elevator system 11 may comprise sliding rails 206 coupled to the boat 33, and the base frame 205 may be slidably coupled to the sliding rails 206. Thus, the reeling apparatus 203 may be configured to slide horizontally along the boat 33, as shown. Specifically, FIG. 11A shows the submersible inspection sensor sled 101 and base frame 205 positioned beyond the bow or distal/front end of the boat 33 for deployment of the submersible inspection sensor sled 101. Conversely, FIG. 1*l*B shows how the submersible inspection sensor sled 101 and base frame 205 may slide inward or within the boat 33 to further secure the submersible inspection sensor sled 101 for transport. Various embodiments of the sliding rails 206 may include, without limitation, sliding barn-door guide, sliding door roller guides, skate wheel conveyer rails, and the like. It should be noted, however, additional mechanisms may also be implemented to overcome or minimize unintended slides caused by waves and currents acting upon the floating vessel 30.

Furthermore, FIGS. 11A and 11B show other embodiments of the submersible inspection sensor sled 101 and reeling apparatus 203. Here, FIGS. 11A and 11B show that the submersible inspection sensor sled 101 may comprise a single pair of guide bars 140 in the form of side skids while replacing the second pair of guide bars 141 with four guide wheels 150 rotatably coupled directly onto the base sled frame 105 (rather than the opposing ends of the guide bars 141). Specifically, unlike the previous embodiments, the guide wheels 150 may be rotatably coupled at or near the centers of the upper and lower u-shaped frames 110, 120, as shown, such that the guide wheels 150 may share a collinear axis with the horizontal bars 113, 123 of the upper u-shaped frame 110 and lower u-shaped frame 120. This configuration may help prevent or minimize damage to the boat 33 during retrieval of the submersible inspection sensor sled 101. In alternative embodiments, the guide wheels 150 may also be rotatably coupled at various angles and axes with respect to the upper u-shaped frame 110, lower u-shaped frame 120 to accommodate/overcome obstructions (e.g., batter piles) or lack of under-deck clearance.

Finally, FIG. 11B shows that the submersible inspection sensor sled 101 may further comprise one or more fins 122, which may be relatively thin, rigid, flat, or sometimes curved surfaces or structures configured to guide the yaw of the submersible inspection sensor sled in a desired direction. Thus, given that embodiments of the fins 122 are typically fixed or stationary coupled to the submersible inspection sensor sled 101, the fins 122 may be configured to ensure consistent orientation of the submersible inspection sensor sled 101 (e.g., about the yaw-axis) when operating on vertical piles 20 in strong water currents.

Regarding the reeling apparatus 203, FIGS. 11A and 11B show that the reeling apparatus 203 may comprise reeling arms 210 that are rotationally fixed (i.e., non-pivoting, non-telescoping). Notably, FIGS. 11A and 11B also show that the reeling apparatus 203 may comprise guide pulleys 219 (which may be fixedly coupled to the reeling arms 210) for level attitude of the submersible inspection sensor sled 101 when hoisting during deployment and retrieval. FIGS. 11A and 11B show that the base frame 205 comprising sliding rails 206 may be better suited to utilize fixed guide pulleys 219 here, as the reeling arms 210, which are likewise fixed onto the base sled frame 205 and stationary, may extend beyond the bow of the boat 33 via the sliding rails 206 or sliding mechanism.

Figure 12:
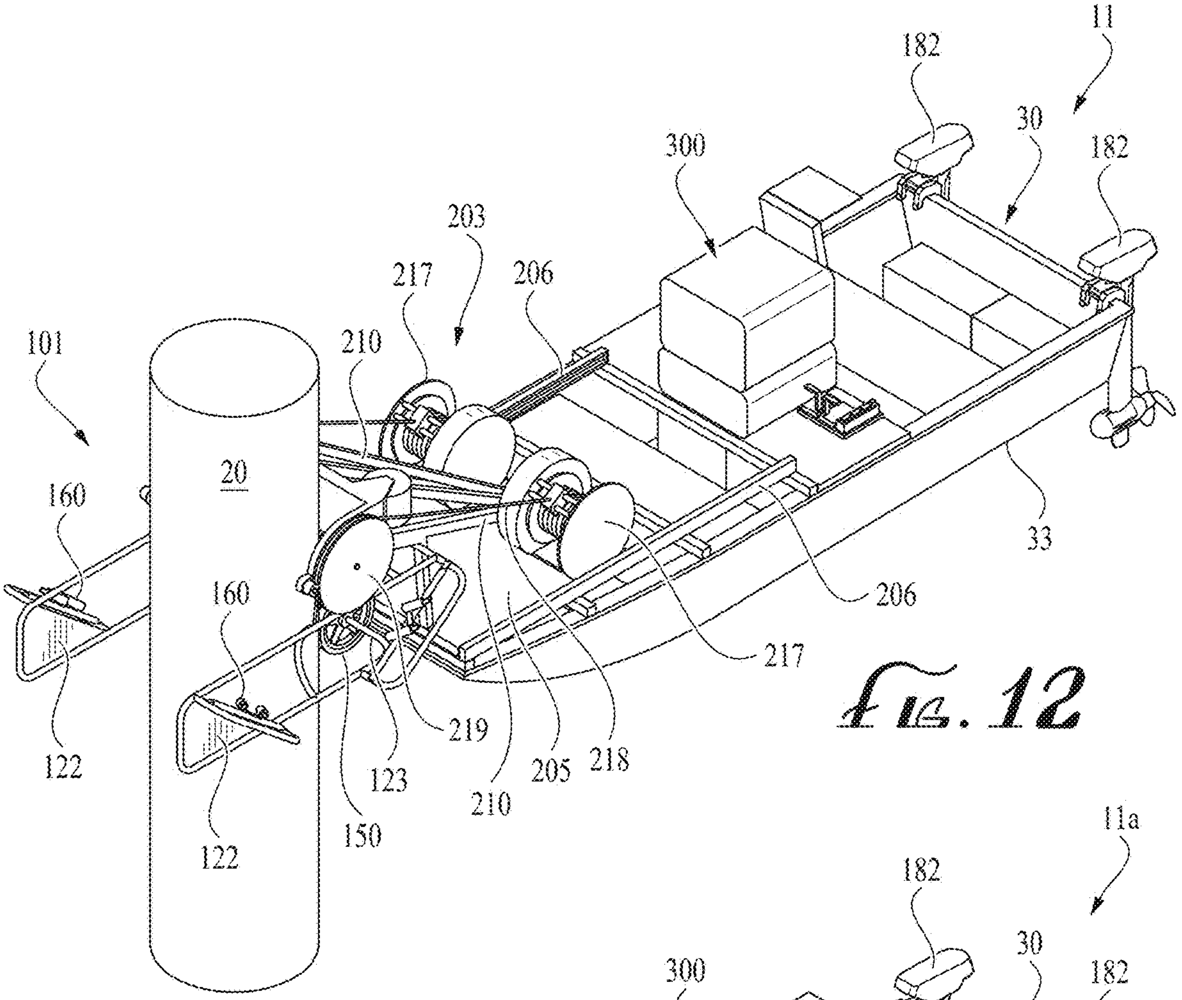
FIG. 12 is an illustration of a perspective view of another embodiment of a floating inspection sensor elevator system and shows the submersible inspection sensor sled engaging a pile prior to being deployed into the water.

FIG. 12 is an illustration of a perspective view of another embodiment of a floating inspection sensor elevator system 11 and shows the submersible inspection sensor sled 101 engaging a pile 20 prior to being deployed into the water 3. Notably, FIG. 12 also shows how the reeling apparatus 203 may slide horizontally toward the bow or distal/front end of the boat 33. In this manner, the base frame 205 may be in a deployed position for the floating inspection sensor elevator system 11 to inspect the pile 20.

Figure 13:
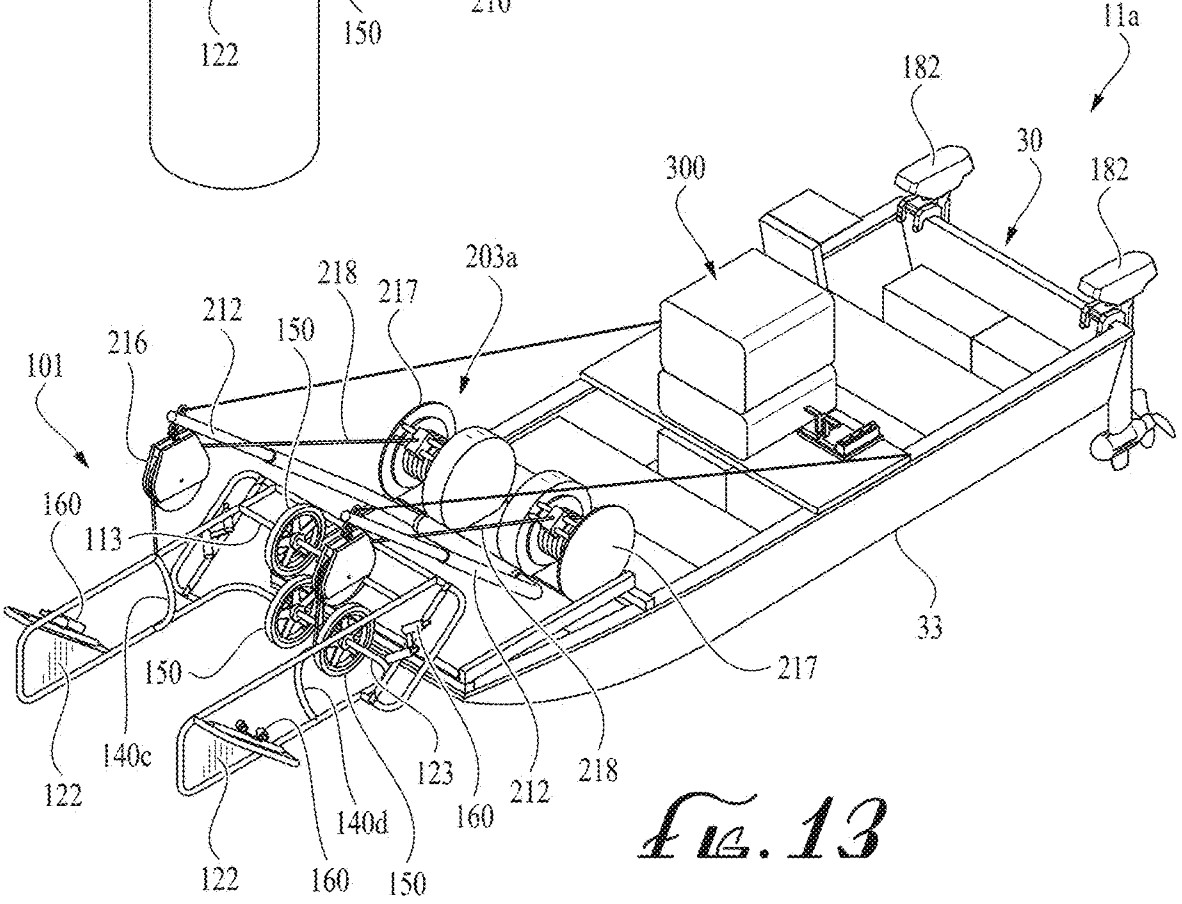
FIG. 13 is an illustration of a perspective view of another embodiment of a floating inspection sensor elevator system and shows the reeling arms pivotally mounted to the base frame and are telescoping in length.

FIG. 13 is an illustration of a perspective view of another embodiment of a floating inspection sensor elevator system 11*a* and shows the reeling arms pivotally mounted to the base frame and are telescoping in length. As shown in FIG. 13, another embodiment of the floating inspection sensor elevator system 11*a* may comprise: a submersible inspection sensor sled 101 and reeling apparatus 203*a*. Like the embodiment shown in FIG. 9, the reeling arms 212 of the reeling apparatus 203 shown in FIG. 13 may rotate between approximately 0 degrees and 180 degrees relative to the base frame 205. The reeling arms 212 may also be telescoping, such that the reeling arms 212 may extend or collapse when needed. Therefore, unlike the fixed reeling arms 210, embodiments of the reeling arms 212 shown in FIG. 13 are generally more versatile and may provide a wider range of motion over a larger area. Other embodiments of the reeling arms 212 may also include other features such as being able to rotate and swivel with respect to the base. Additional pulleys, sheaves, wheels, or rollers may also be used without deviating from the scope of the disclosure.

Figure 14:
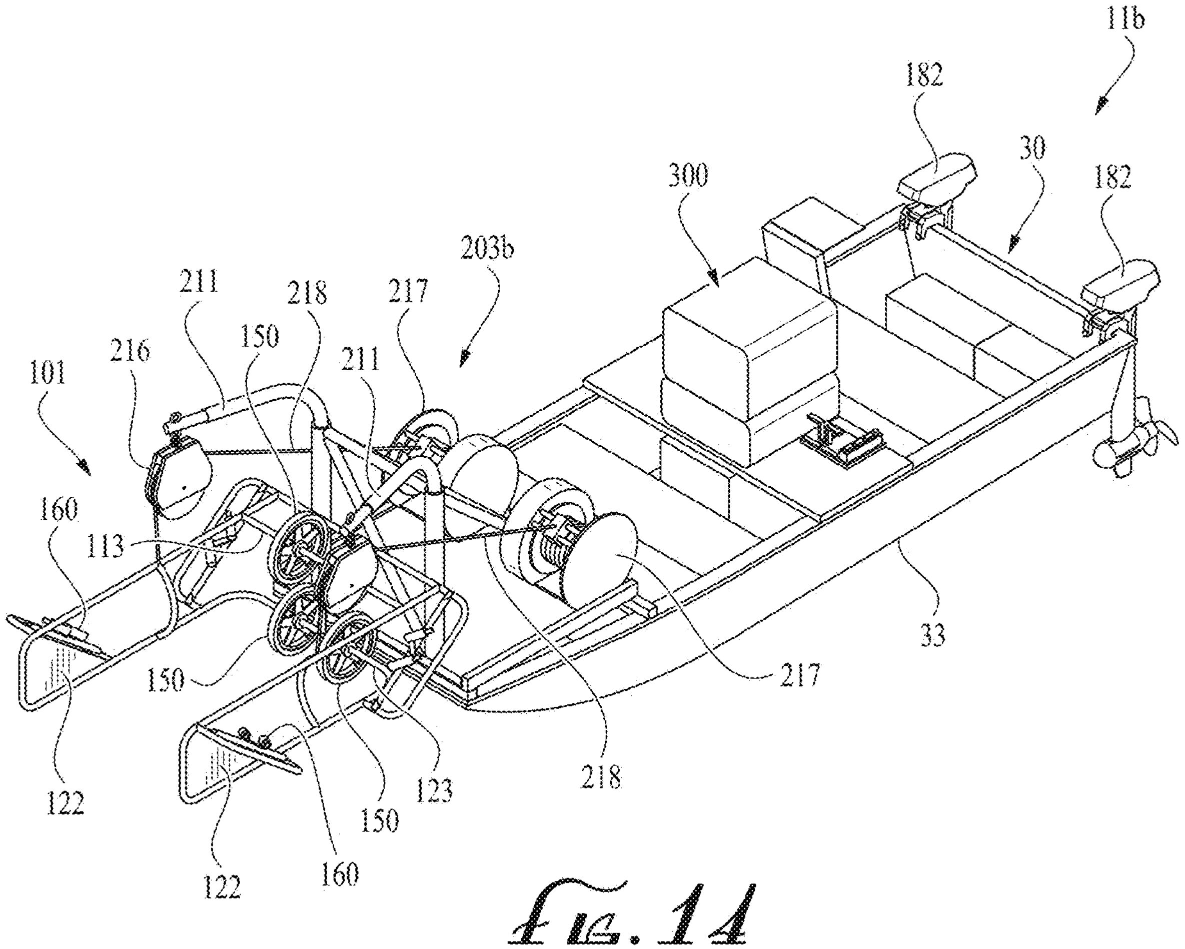
FIG. 14 is an illustration of a perspective view of another embodiment of a floating inspection sensor elevator system and shows the reeling arms as davit arms.

FIG. 14 is an illustration of a perspective view of another embodiment of a floating inspection sensor elevator system 11*b* and shows the reeling arms 211 as davit arms. As shown in FIG. 14, another embodiment of the floating inspection sensor elevator system 11*b* may comprise: a submersible inspection sensor sled 101 and reeling apparatus 203*b*. Like the embodiment shown in FIG. 8, the reeling arms 211 may be davit arms, which are crane-like devices used to lower and raise the submersible inspection sensor sled 101. Unlike fixed reeling arms 210, which are immovable and stationary, davit arms are usually more versatile and efficient, especially in confined spaces. The davit arms, for example, may be configured to swivel, pivot, rotate, or otherwise move with respect to the post in a generally horizontal plane to provide a wide range of motion. Various embodiments of the davit arms can also be configured to extend and swivel back and forth to allow a respective umbilical cable 218 and pulley 216 to have range over a larger area over the floating inspection elevators sensor system. In addition to the davit arms, additional pulleys, sheaves, wheels, or rollers may be used to further ensure level sled attitude, as for example, pulleys having sheaves with various diameters to redirect the cables to lower fatigue and lengthen the life of the umbilical cables 218.

FIG. 15 is an illustration of a perspective view of another embodiment of a floating inspection sensor elevator system 13 and shows the floating vessel as a pair of pontoons 34. As shown in FIG. 15, another embodiment of the floating inspection sensor elevator system 13 may comprise: a submersible inspection sensor sled 102 and reeling apparatus 204. Notably, as shown in FIG. 15, the floating vessel 30 may be a pair of pontoons 34. As used herein and described above, the term "pontoon" may refer to any airtight and hollow floating structure or platform, a set or pair of which may serve as a boat or buoyant vessel. In various embodiments, like the hull 31, each pontoon 34 may be rectangular, square, round, ellipsoidal, hexagonal or another polygonal shape.

Unlike the hulls 31 or boat 33, the pontoons 34 may be airtight and hollow to prevent water resistance and provide buoyancy. Other embodiments of the pontoons 34 may not be airtight but rather possess variable buoyancy, whereas other embodiments of pontoons 34 may not be hollow (e.g., foam-filled). Like the hulls 31, various embodiments of the pontoons 34 may also have an external perimeter comprising additional impact bars, frames, or bent-tube corners/tubing to reduce the likelihood of snag and minimize impact to the pontoon 34 itself. The pontoon configuration may also possess a small amount of deck space to create minimal clearance. In this manner, the floating inspection sensor elevator system 13 may be more maneuverable and possess minimal deck space for ease of deployment of the submersible inspection sensor sled 102.

In this embodiment, each pontoons 34 may have a rail 31*a* or sliding rail coupled to the pontoons 34, and the base frame 205 may be mounted near proximal ends of the rails 31*a* or rear ends of the pontoons 34. As a result, the pontoons 34, rails 31*a*, and base frame 205 have a substantially u-shaped configuration as shown for additional support of the submersible inspection sensor sled 100, 101, 102 and to help engage a pile 20 for inspection, if needed. In other embodiments, the width of each pontoons 34 may also be adjusted or configurable to provide additional stability towards the floating inspection sensor elevator system 13.

Notably, in this embodiment, the reeling arms 210 may be configured as support rails that are fixed and disposed in parallel relation to each other. Here, each reeling arm 210 or support rail may be positioned directly above a respective pontoon 34 and may have opposing ends coupled to the proximal and distal ends of a respective hull 31. Guide pulleys 219 may be implemented in lieu of sheaves 217 to provide further stability for deployment of the submersible inspection sensor sled 102. In other embodiments, the reeling arms 210 may be davit arms with pulleys or sheaves to provide umbilical redirects. In other embodiments, additional pulleys may also be implemented.

Finally, FIG. 15 shows another embodiment of the submersible inspection sensor sled 102, comprising guide wheels 149 rotatably coupled to various portions of the submersible inspection sensor sled 102. For example, the guide wheels 149 may rotatably couple directly either onto the upper u-shaped frame 110, lower u-shaped frame 120, or both. Here, the guide wheels 149 may share a collinear axis with the upper u-shaped frame 110, lower u-shaped frame 120, or both (i.e., rod/re-bar type frame). If the guide wheels 149 are not collinear to the upper u-shaped frame 110 or lower u-shaped frame 120, alternative embodiments of the guide wheels 149 may be rotatably coupled to various angles and axes to the upper u-shaped frame 110, lower u-shaped frame 120, or guide bars 140, 141. Other embodiments of the submersible inspection sensor sled may also further comprise skids 140*c*, 140*d*, as shown in FIG. 13.

FIG. 16 is a block diagram of one embodiment of the floating inspection sensor elevator system 10 and shows the inner workings of the computer system 300 and the flow of sensor data 161 between the sensors 160 and computer system 300. As shown in FIG. 16, one embodiment of the floating inspection sensor elevator system 10 may comprise a submersible inspection sensor sled 100 having sensors 160, reeling apparatus 200, and computer system 300.

As described above, the computer system 300 may be terminal or user station comprising one or more processors 305 that used to perform the operations of the floating inspection sensor elevator system 10, including reading, processing, and/or analyzing sensor data 161 generated from the sensors 160. The processors 305 may also be configured to perform other functions such as controlling the reels, lifting/lowering of the submersible inspection sensor sled 100 via the reeling arms (if applicable), and/or controlling the thruster system (if applicable).

In an exemplary embodiment, the computer system 300 may comprise: one or more processors 305, memory unit 310, storage unit 315, and display unit 320 capable of displaying a graphical user interface 325. The processor(s) 305 may include, without limitation, a microprocessor, digital signal processor (DSP), microcontroller, and/or the like. The memory unit 310 may be configured to store instructions for the processor 305 and may include, without limitation, a computer-readable medium device such as floppy disk, magnetic hard disk drive, universal serial bus (USB) thumb drive, solid state hard disk, secure digital (SD) memory card, and memory such as a memory buffer, flash memory, random access memory (RAM), memory, read-only memory (ROM), optical disk, magneto-optical disk, and register files of a processor. The memory unit 310 may store, for example, various data such as video data, image data, sensor data 161, and/or the like and one or more machine learning models, and/or code that includes instructions to cause a processor to execute one or more processes or functions.

Embodiments of the computer system 300 may also comprise hardware and/or software components to facilitate signal or data communication between the sensors 160 and external devices. In various embodiments, the computer system 300 may further comprise a communication interface operatively coupled to the processor 305 and/or the memory unit 310, and the communication interface may include, without limitation, a network interface card (NIC), Bluetooth®, WiFi®, optical communication module, or the like. The communication interface may be used to facilitate transmission and receipt of data, including sensor data 161.

Importantly, the computer system 300 may also comprise hardware or software for receiving and processing sensor data 161. The processor 305 may contain and/or can access from the memory unit 310 instructions to cause the computer system 300 to receive from the submersible inspection sensor sled 100, sensor data 161 associated with the sensors 160 via the umbilical cables 218, and in various embodiments, the sensor data 161 may contain various measured data points to capture one or more aspects of a pile 20.

FIG. 16 also shows how the computer system 300 may receive the sensor data 161 from the sensors 160. The sensors 160, which may include a camera 166, sonar transducer 167, or laser scanner 168, may inspect one or more aspects of a pile 20, 21, and generate sensor data 161 based on those aspects. For example, a camera 166 may create video imagery as sensor data 161, whereas a sonar transducer 167 may create sonar or acoustical data as sensor data 161. Alternatively, a laser scanner 168 may transmit a laser beam to obtain light or optical data as sensor data 161. In various embodiments the sensors 160 may include a single sensor or multiple sensors that may be combinations of the above.

As shown in FIG. 16, the sensor data 161 may be transmitted to the computer system 300 or processor 305 via the umbilical cables 218. The sensor data 161 may then be processed and analyzed by the processor 305 and measurements may be obtained. The processed data may then be sent, transmitted, or uploaded to a memory unit 310 or storage unit 315. Each memory unit 310 and/or storage unit 315 may comprise a computer-readable medium, which stores instructions or programs executable by the processor 305. A graphical user interface 325 may be displayed to the user for the user to analyze the sensor data 161 generated by the sensors 160.

The foregoing description of the embodiments of the floating inspection sensor elevator system has been presented for the purposes of illustration and description. While multiple embodiments are disclosed, other embodiments will become apparent to those skilled in the art from the above detailed description. As will be realized, these embodiments are capable of modifications in various obvious aspects, all without departing from the spirit and scope of the present disclosure. Accordingly, the detailed description is to be regarded as illustrative in nature and not restrictive.

Although embodiments of the floating inspection sensor elevator system are described in considerable detail, other versions are possible. Therefore, the spirit and scope of the appended claims should not be limited to the description of versions included herein.

Except as stated immediately above, nothing which has been stated or illustrated is intended or should be interpreted to cause a dedication of any component, step, feature, object, benefit, advantage, or equivalent to the public, regardless of whether it is or is not recited in the claims. The scope of protection is limited solely by the claims that now follow, and that scope is intended to be broad as is reasonably consistent with the language that is used in the claims. The scope of protection is also intended to be broad to encompass all structural and functional equivalents.

What is claimed as new and desired to be protected by Letters Patent is set forth in the appended claims:

1. A floating inspection sensor elevator system, comprising:

a submersible inspection sensor sled having a u-shaped configuration and comprising:

a base sled frame configured to engage a pile and comprising: upper and lower u-shaped frames coupled to each other and disposed in parallel relation, each of said upper and lower u-shaped frames comprising a pair of arms and a horizontal bar joining proximal ends of said pair of arms;

a plurality of guide wheels configured to slide said submersible inspection sensor sled along said pile; and one or more sensors oriented to focus substantially inwards towards a center area within said upper and lower u-shaped frames, said one or more sensors being configured to inspect one or more aspects of said pile and generate sensor data;

a reeling apparatus, comprising:

a base frame configured to mount onto a floating vessel;

a pair of reeling arms mounted to said base frame and disposed in parallel relation to each other;

a pair of reels coupled to said base frame;

a pair of pulleys, each swivelly coupled near distal ends of each of said pair of reeling arms; and a pair of umbilical cables having distal umbilical cable ends coupled to said submersible inspection sensor sled, proximal umbilical cable ends windable to said pair of reels, and intermediate umbilical cable portions reeved around sheaves of said pair of pulleys; and a computer system comprising one or more processors configured to process said sensor data generated by said one or more sensors and control said pair of reels;

wherein said pair of umbilical cables are in signal communication between said one or more sensors and said computer system, said pair of umbilical cables being configured to transfer said sensor data from said submersible inspection sensor sled to said computer system.

2. The floating inspection sensor elevator system, according to claim 1, wherein said floating vessel is a boat.

3. The floating inspection sensor elevator system, according to claim 1, wherein said floating vessel is a pair of hulls, each having a rail coupled to said hull;

wherein said base frame is mounted near proximal ends of said pair of rails, such that said pair of hulls, said pair of rails, and said base frame have a substantially u-shaped configuration;

wherein said floating inspection sensor elevator system further comprises a thruster system coupled to said pair of hulls; and wherein said computer system is configured to control said thruster system.

4. The floating inspection sensor elevator system, according to claim 1, wherein at least one of said pair of reeling arms is a davit arm.

5. The floating inspection sensor elevator system, according to claim 3, wherein said pair of reeling arms are a pair of support rails disposed in parallel relation to each other and fixedly coupled to said pair of rails coupled to said pair of hulls.

6. The floating inspection sensor elevator system, according to claim 1, wherein said one or more sensors is selected from the group of sensors, consisting of: a camera, a sonar, and a laser scanner.

7. The floating inspection sensor elevator system, according to claim 1, wherein said pair of reeling arms is pivotally mounted to said base frame and is telescoping in length.

8. The floating inspection sensor elevator system, according to claim 1, wherein said base frame further comprises a pair of sliding rails configured to mount onto said floating vessel, such that said base frame is configured to slide horizontally along said floating vessel.

9. A floating inspection sensor elevator system, comprising:

a submersible inspection sensor sled having a u-shaped configuration and comprising:

a base sled frame configured to engage a pile and comprising: upper and lower u-shaped frames coupled to each other and disposed in parallel relation;

a plurality of guide wheels configured to slide said submersible inspection sensor sled along said pile; and one or more sensors oriented to focus substantially inwards towards a center area within said upper and lower u-shaped frames, said one or more sensors being configured to inspect one or more aspects of said pile and generate sensor data;

a reeling apparatus, comprising:

a base frame configured to mount onto a boat;

first and second reeling arms mounted to said base frame and disposed in parallel relation to each other;

first and second reels coupled to said base frame;

first and second pulleys swivelly coupled near distal ends of said first and second reeling arms, respectively;

a first umbilical cable having a first distal umbilical cable end coupled to said submersible inspection sensor sled, a first proximal umbilical cable end windable to said first reel, and a first intermediate umbilical cable portion reeved around a first sheave of said first pulley; and a second umbilical cable having a second distal umbilical cable end coupled to said submersible inspection sensor sled, a second proximal umbilical cable end windable to said second reel, and a second intermediate umbilical cable portion reeved around a second sheave of said second pulley; and a computer system comprising one or more processors configured to process said sensor data generated by said one or more sensors and control said pair of reels;

wherein said first and second umbilical cables are in signal communication between said one or more sensors and said computer system, said first and second umbilical cables being configured to transfer said sensor data from said submersible inspection sensor sled to said computer system.

10. The floating inspection sensor elevator system, according to claim 9, wherein said upper u-shaped frame comprises: first and second arms disposed in parallel relation to each other and a first horizontal bar having opposing ends orthogonally joining proximal ends of said first and second arms;

wherein said lower u-shaped frame comprises: third and fourth arms disposed in parallel relation to each other and a second horizontal bar having opposing ends orthogonally joining proximal ends of said third and fourth arms; and wherein said submersible inspection sensor sled further comprises:

a plurality of vertical bars coupled to said upper and lower u-shaped frames; and a plurality of guide bars coupled to said upper and lower u-shaped frames and disposed in a substantially vertical manner, wherein said plurality of guide wheels are rotatably coupled to opposing ends of said plurality of guide bars.

11. The floating inspection sensor elevator system, according to claim 9, wherein said first and second reeling arms are davit arms.

12. The floating inspection sensor elevator system, according to claim 9, wherein said pair of reeling arms is pivotally mounted to said base frame and are telescoping in length.

13. The floating inspection sensor elevator system, according to claim 9, wherein said base frame further comprises first and second sliding rails configured to mount onto said boat, such that said base frame is configured to slide horizontally along said boat.

14. The floating inspection sensor elevator system, according to claim 9, wherein said one or more sensors is selected from the group of sensors, consisting of: a camera, a sonar, and a laser scanner.

15. A floating inspection sensor elevator system, comprising:

a submersible inspection sensor sled having a u-shaped configuration and comprising:

a base sled frame configured to engage a pile and comprising: upper and lower u-shaped frames coupled to each other and disposed in parallel relation;

a plurality of guide wheels configured to slide said submersible inspection sensor sled along said pile; and one or more sensors oriented to focus substantially inwards towards a center area within said upper and lower u-shaped frames, said one or more sensors being configured to inspect one or more aspects of said pile and generate sensor data;

a reeling apparatus, comprising:

a base frame configured to mount on to first and second hulls, comprising first and second rails, respectively, said first rail being coupled to said first hull and said second rail being coupled to said second hull;

wherein said base frame is mounted near proximal ends of said first and second rails, such that said first and second hulls, said first and second rails, and said base frame have a substantially u-shaped configuration;

first and second reeling arms mounted to said base frame and disposed in parallel relation to each other;

first and second reels coupled to said base frame;

first and second pulleys swivelly coupled near distal ends of said first and second reeling arms, respectively;

a first umbilical cable having a first distal umbilical cable end coupled to said submersible inspection sensor sled, a first proximal umbilical cable end windable to said first reel, and a first intermediate umbilical cable portion reeved around a first sheave of said first pulley; and a second umbilical cable having a second distal umbilical cable end coupled to said submersible inspection sensor sled, a second proximal umbilical cable end windable to said second reel, and a second intermediate umbilical cable portion reeved around a second sheave of said second pulley;

a thruster system coupled to said first and second hulls; and a computer system comprising one or more processors configured to process said sensor data generated by said one or more sensors and control said pair of reels and said thruster system;

wherein said first and second umbilical cables are in signal communication between said one or more sensors and said computer system, said first and second umbilical cables being configured to transfer said sensor data from said submersible inspection sensor sled to said computer system.

16. The floating inspection sensor elevator system, according to claim 15, wherein said upper u-shaped frame comprises: first and second arms disposed in parallel relation to each other and a first horizontal bar having opposing ends orthogonally joining proximal ends of said first and second arms;

wherein said lower u-shaped frame comprises: third and fourth arms disposed in parallel relation to each other and a second horizontal bar having opposing ends orthogonally joining proximal ends of said third and fourth arms; and wherein said submersible inspection sensor sled further comprises:

a plurality of vertical bars coupled to said upper and lower u-shaped frames; and a plurality of guide bars coupled to said upper and lower u-shaped frames and disposed in a substantially vertical manner, wherein said plurality of guide wheels are rotatably coupled to opposing ends of said plurality of guide bars.

17. The floating inspection sensor elevator system, according to claim 15, wherein said first and second reeling arms are davit arms.

18. The floating inspection sensor elevator system, according to claim 15, wherein said first and second reeling arms are first and second support rails disposed in parallel relation to each other and fixedly coupled to and above said first and second hulls, respectively.

19. The floating inspection sensor elevator system, according to claim 15, wherein said first and second reeling arms are pivotally mounted to said base frame and are telescoping in length.

20. The floating inspection sensor elevator system, according to claim 15, wherein said one or more sensors is selected from the group of sensors, consisting of: a camera, a sonar, and a laser scanner.

* * * * *